(12) United States Patent
Fitzmaurice

(10) Patent No.: US 7,770,135 B2
(45) Date of Patent: Aug. 3, 2010

(54) TRACKING MENUS, SYSTEM AND METHOD

(75) Inventor: George William Fitzmaurice, Toronto (CA)

(73) Assignee: Autodesk, Inc., San Rafael, CA (US)

(*) Notice: Subject to any disclaimer, the term of this patent is extended or adjusted under 35 U.S.C. 154(b) by 810 days.

(21) Appl. No.: 10/684,580

(22) Filed: Oct. 15, 2003

(65) Prior Publication Data
US 2004/0135824 A1 Jul. 15, 2004

Related U.S. Application Data

(60) Provisional application No. 60/419,144, filed on Oct. 18, 2002.

(51) Int. Cl.
*G06F 3/048* (2006.01)
(52) U.S. Cl. .................. 715/856; 715/808; 715/810
(58) Field of Classification Search ................ 715/856, 715/711, 808, 810, 840, 861, 864
See application file for complete search history.

(56) References Cited

U.S. PATENT DOCUMENTS

| | | | |
|---|---|---|---|
| 4,720,703 A * | 1/1988 | Schnarel et al. ............. 345/163 |
| 4,931,783 A | 6/1990 | Atkinson | |
| 5,276,795 A * | 1/1994 | Hoeber et al. ............... 715/813 |
| 5,500,936 A * | 3/1996 | Allen et al. ................. 715/808 |
| 5,581,670 A | 12/1996 | Bier et al. | |
| 5,627,960 A | 5/1997 | Clifford | |
| 5,634,064 A | 5/1997 | Warnock et al. | |
| 5,638,523 A | 6/1997 | Mullet et al. | |
| 5,666,499 A | 9/1997 | Baudel et al. | |
| 5,689,667 A | 11/1997 | Kurtenbach | |
| 5,760,773 A | 6/1998 | Berman et al. | |
| 5,798,752 A | 8/1998 | Buxton et al. | |
| 5,828,360 A * | 10/1998 | Anderson et al. ........... 715/834 |
| 6,037,937 A * | 3/2000 | Beaton et al. ............... 715/764 |
| 6,097,387 A * | 8/2000 | Sciammarella et al. ...... 715/784 |
| 6,118,427 A | 9/2000 | Buxton et al. | |
| 6,246,411 B1 * | 6/2001 | Strauss ....................... 715/863 |

(Continued)

OTHER PUBLICATIONS

Microsoft, screen captures from "Microsoft Excel 2000", 2000, p. 1-2.*

(Continued)

*Primary Examiner*—Steven B Theriault
*Assistant Examiner*—Tuyetlien T Tran
(74) *Attorney, Agent, or Firm*—Staas & Halsey LLP

(57) ABSTRACT

The present invention is a system that includes a tracking menu that tracks the movement of a position transducer, such as a stylus or a mouse, as the transducer is moved about in association with a display. The menu is typically displayed on top of other objects in the display. The menu includes a tracking symbol, such as an arrow or cursor, positioned corresponding to inputs from the transducer as it is moved by a user. A mobile tracking region is also included. This tracking region has a tracking boundary or edge enclosing the tracking symbol where the tracking symbol is movable within the boundary or hits without the menu moving. The tracking region or entire menu moves in correspondence to the tracking symbol when the tracking symbol encounters the boundary or hits while the symbol is moving. The tracking region also has menu controls or buttons that are activatable when the tracking symbol corresponds to the controls.

56 Claims, 19 Drawing Sheets

U.S. PATENT DOCUMENTS

| | | | |
|---|---|---|---|
| 6,262,719 | B1 | 7/2001 | Bi et al. |
| 6,369,837 | B1* | 4/2002 | Schirmer .................... 715/764 |
| 6,549,219 | B2 | 4/2003 | Selker |
| 6,865,719 | B1* | 3/2005 | Nicholas, III ............... 715/856 |
| 6,918,091 | B2 | 7/2005 | Leavitt et al. |
| 6,938,221 | B2* | 8/2005 | Nguyen ...................... 715/863 |
| 7,058,902 | B2* | 6/2006 | Iwema et al. ............... 715/810 |
| 2001/0009428 | A1 | 7/2001 | Dow et al. |
| 2002/0085037 | A1* | 7/2002 | Leavitt et al. ............... 345/765 |
| 2002/0101458 | A1 | 8/2002 | SanGiovanni |
| 2002/0201458 | | 8/2002 | SanGiovanni |
| 2002/0175955 | A1* | 11/2002 | Gourdol et al. ............. 345/821 |

OTHER PUBLICATIONS

Adobe Photoshop 5, pp. 1-2, published 1998.*

Accot, J. Zhai, S. (2002), "More than dotting the I's—foundations for crossing-based interfaces", Proceedings of ACM CHI 2002, pp. 73-80.

Bier, E. A., Stone, M.C., Fishkin, K., Buxton, W., Baudel, T., (1994), "A Taxonomy of See Through Tools", Proceedings of the ACM CHI 1994, pp. 358-364.

Buxton, W., (1990), "A Three-State Model of Graphical Input", In D., Diaper et al. (Eds), Human-Computer Interaction—INTERACT '90., Amsterdam: Elsevier Science Publishers B.V., (North-Holland), pp. 449-456.

Buxton, W., Fitzmaurice, G., Balakrishnan, R., and Kurtenbach, G. (200), "From Traditional to Electronic Large Displays in Automotive Design", IEEE Computer Graphics and Applications, 20(4), pp. 68-75.

Callahan, J., Hopkins, D., Weiser, M. & Shneiderman, B. (1988), "An Empirical Comparison of Pie vs. Linear Menus", Proceedings of CHI '88, pp. 95-100.

Elrod, S., Bruce, R., Gold, R., Goldberg, D., Halasz, EG., Janssen, Jr., W. C., Lee, D., McCall, K., Pedersen, E.R., Pier, K.A., Tang., and Welch, B., (1992), "Liveboard: A Large Interactive Display Supporting Group Meetings, Presentations, and Remote Collaboration", Proceedings of ACH CHI 1992, pp. 599-607.

Guimbretiere, F., Stone, M. & Winograd, T., (2001), "Fluid Interaction with High-Resolution Wall-size Displays", Proceedings of ACM UIST 2001, pp. 21, 30.

Guimbretiere, F., and Winograd, T., (2000), "FlowMenu: Combining Command, Text, and Data Entry", Proceedings of ACM UIST 2000, pp. 213-216.

Harrison, B., Kurtenbach, G., Vincente, K., (1995), "An Experiment Evaluation of Transparent User Interface Tools and Information Content", Proceedings of ACM UIST, 1995, pp. 81-90.

Harrision, B., Fishkin, K., Gujar A., Mochon, C., Want, R. (1998), "Squeeze me, hold me, tilt me! An Exploration of Manipulative User Interfaces", Proceedings of ACM CHI 1998, pp. 17-24.

Kramer, A., (1994), "Translucent Patches: Dissolving Windows", Proceedings of ACM UIST 1994, pp. 121-130.

Kurtenbach, G. & Buxton, W., (1993), "The limits of expert performance using hierarchical marking menus", Proceedings of the ACM CHI 1993, pp. 482-487.

Kurtenbach, G., Fitzmaurice, G., Baudel, T., Buxton, B., (1997), "The Design of a GUI Paradigm based on Tablets, Two-Hands, and Transparency", Proceedings of ACH CHI 1997, pp. 35-42.

Kurtenbach, G., (1993), The Design and Evaluation of Marking Menus, Ph.D., thesis, University of Toronto, Dept. of Computer Science.

Pook, S., Lecolinet, E., Vaysseix, G., and Barillot,, E. (2000), "Control Menus: Execution and Control in a Single Interactor", Proceedings of ACH CHI 2000 Extended Abstracts, pp. 263-264.

Rubio, J. M. and Janacek, P. (2002), "Floating Pie Menus: Enhancing the functionality of Contextual Tools", Proceedings of ACM UIST 2002 Conference Companion, pp. 39-40.

Venolia, D. and Neiberg, F. (1994), "T-Cube: A Fast, Self-Disclosing Pen-Based Alphabet", Proceedings of ACH CHI 1994, pp. 265-270.

Hopkins, D. (1991), "The Design and Implementation of Pie Menus", Dr. Dobbs Journal, 16(12), pp. 16-26.

Bederson, B.B. and Hollan, J. D. (1994), "Pad++: A Zooming Graphical Interface for Exploring Alternative Interface Physics", Proceedings of ACM UIST 1994, pp. 17-26.

Perlin, K. and Fox, D. (1993), "Pad: An Alternative Approach to the Computer Interface", Proceedings of ACM SIGGRAPH 1993, pp. 57-64.

MacKenzie, I.S. & Buxton, W. (1994), "Prediction of Pointing and Dragging Times in Graphical User Interfaces Interacting With Computer", 6(4), pp. 213-227.

Myers, B. & Buxton, W. (1986), "Creating Highly-Interactive and Graphical User Interfaces by Demonstration", Computer Graphics 20(3), Proceedings of SIGGRAPH '18, pp. 249-258.

Fitzmaurice et al., "Tracking Menus", Alias|Wavefront, pp. 1-10.

Fitzmaurice et al., "Tracking Menus", Proceedings from ACM CHI 2003, vol. 5, Issue 2, pp. 71-80.

U.S. Appl. No. 60/419,144, filed Oct. 18, 2002, Fitzmaurice et al., Autodesk, Inc.

U.S. Appl. No. 10/684,581, filed Oct. 15, 2003, Fitzmaurice et al., Autodesk, Inc.

U.S. Appl. No. 10/684,579, filed Oct. 15, 2003, Fitzmaurice et al., Autodesk, Inc.

* cited by examiner

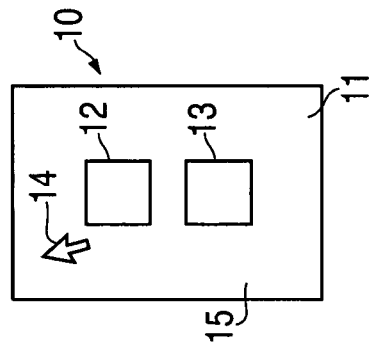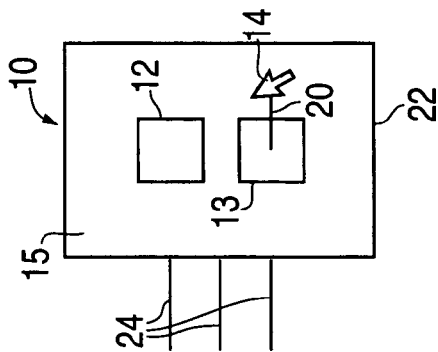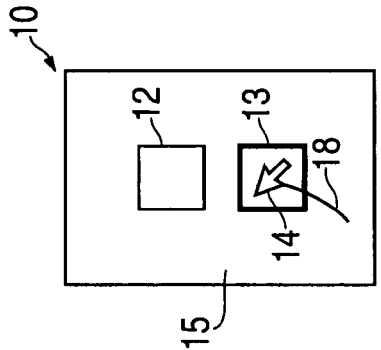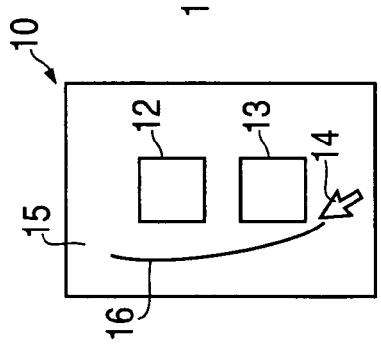

SIDE VIEW

TOP VIEW

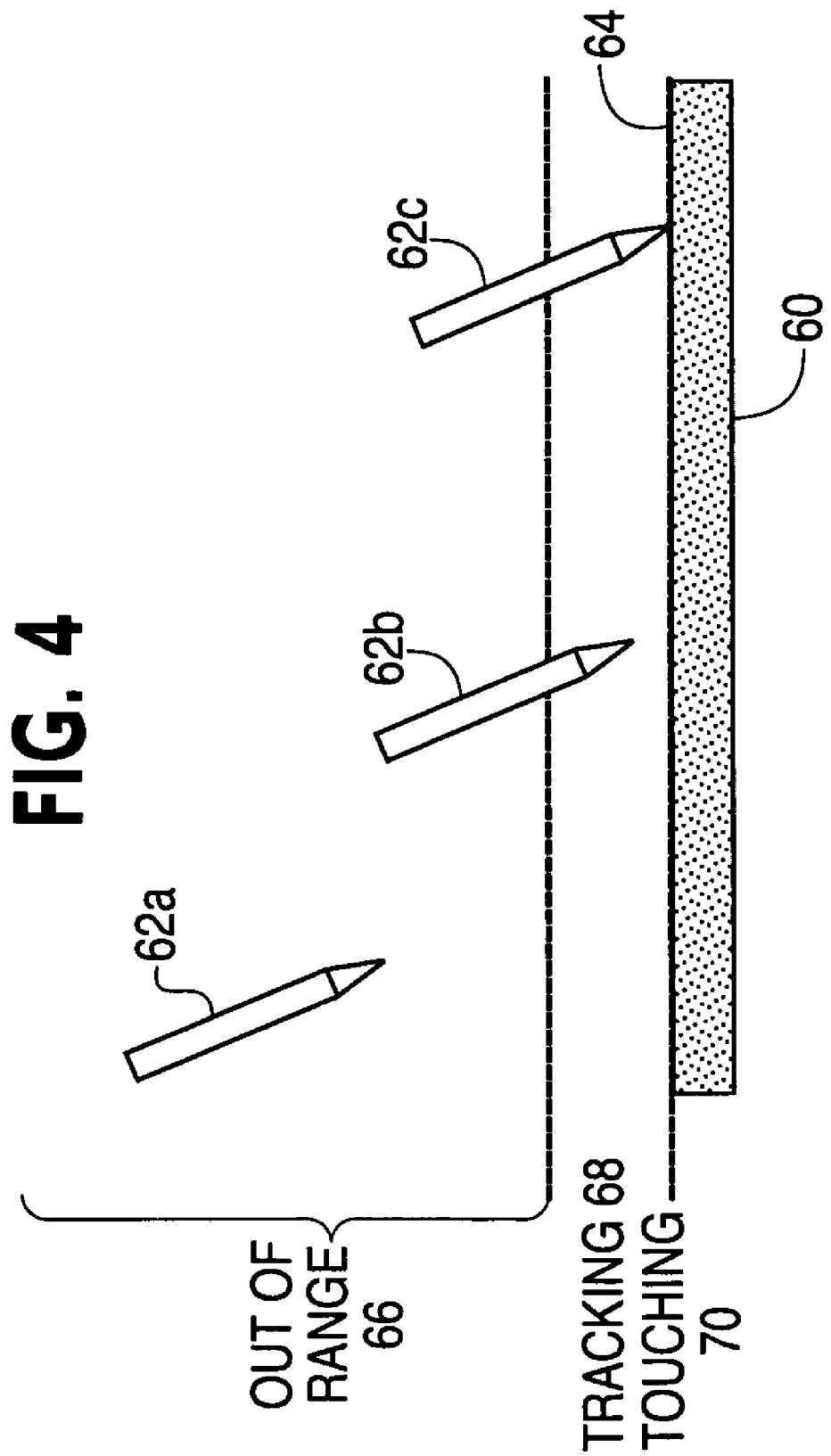

FIG. 6(a)   FIG. 6(b)   FIG. 6(c)
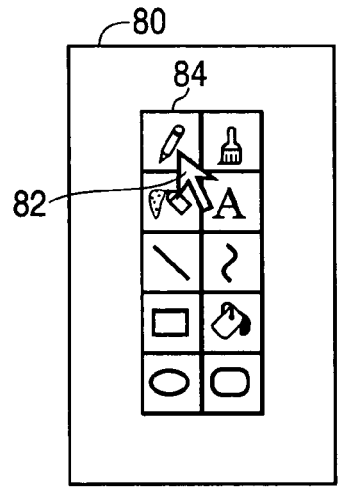
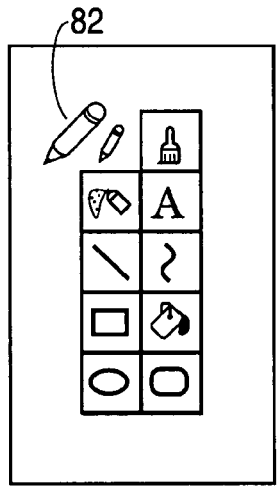
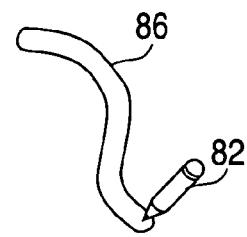
FIG. 6(d)   FIG. 6(e)   FIG. 6(f)
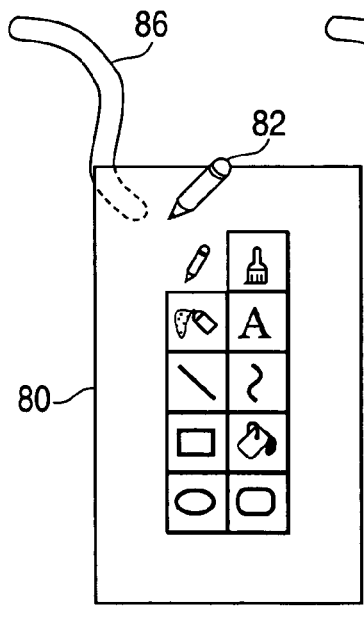
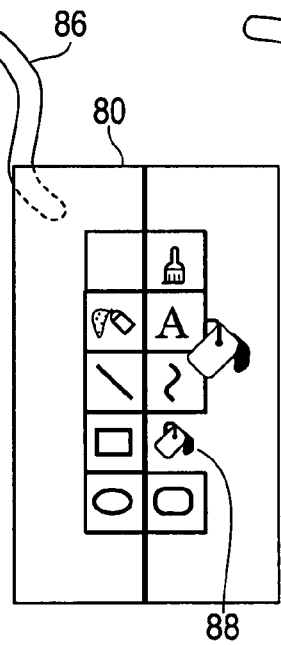
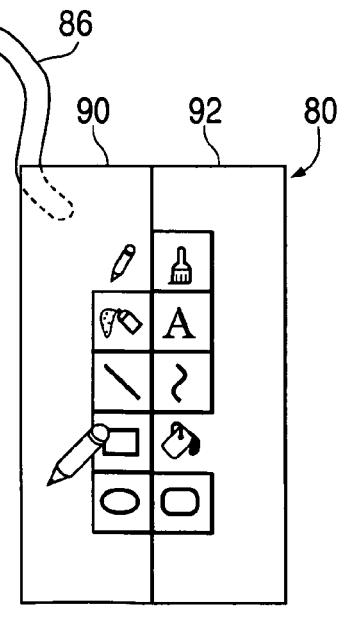

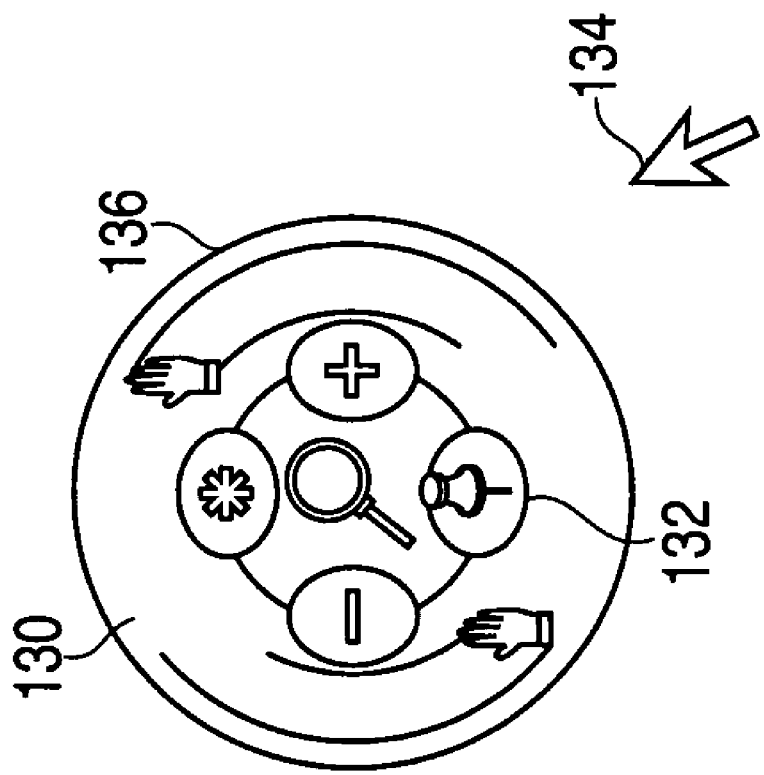
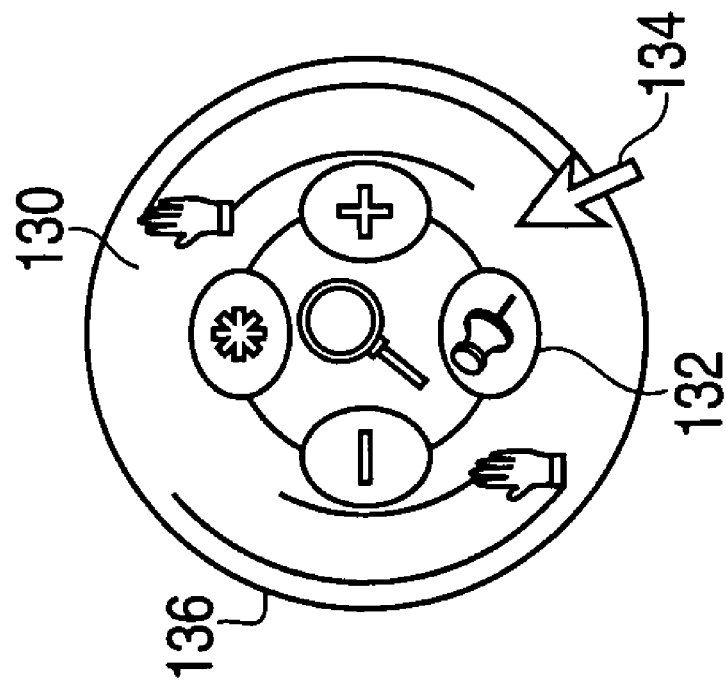

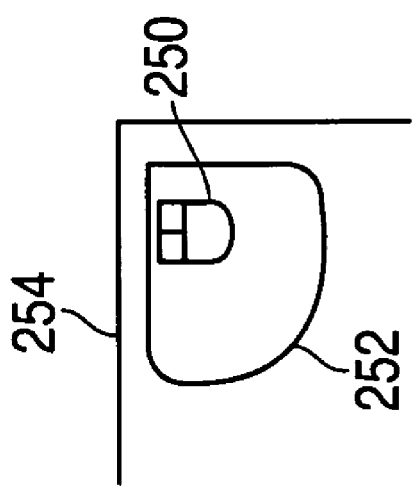
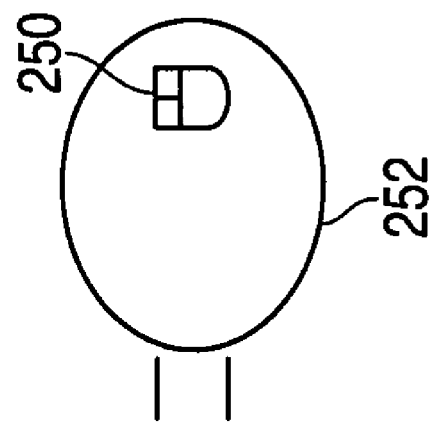
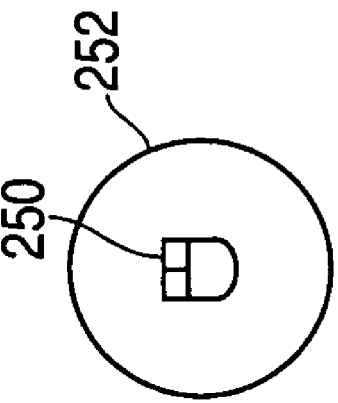

TRACKING MENUS, SYSTEM AND METHOD

CROSS-REFERENCE TO RELATED APPLICATION(S)

This application is related to and claims priority to U.S. provisional application entitled Tracking Menu System having Ser. No. 60/419,144, by Fitzmaurice et al, filed Oct. 18, 2002, this application is also related to U.S. application entitled A Pen-Mouse System having Ser. No. 10/684,581, by Fitzmaurice et al, filed Oct. 15, 2003, and to U.S. application entitled Pan Zoom Tool having Ser. No. 10/684,579, by Fitzmaurice et al, filed Oct. 15, 2003, all of which are incorporated by reference herein.

BACKGROUND OF THE INVENTION

1. Field of the Invention

The present invention is directed to a tracking menu that tracks a position of a transducer that can be moved by a user and that allows the user to select items locally within the menu and, more particularly, to a menu usable with a stylus-tablet PC that tracks the position of the stylus.

2. Description of the Related Art

A user involved in the graphics industry can be required to switch between tools while performing graphics operations. For example the user may need to switch between paintbrushes or between a pan tool and a zoom tool. In keyboard/mouse based systems the switching can be facilitated by accelerator techniques using a particular key, such as the space bar, to switch between the pan and zoom tools. In systems that have a single channel input device, such as pen-based computers like a stylus/pen for tablet PCs, the user does not typically have access to accelerator techniques that are efficient or easy to use. As a result, the user typically moves from the location of the graphics operation on a tablet PC (personal computer) to a menu or tool palette location, to change tools or select a new tool. These tool palette round trips are time consuming. This problem also arises in related technologies such as personal digital assistants (PDAs), touch based interfaces, digitizer tablets, wall displays and 3D environments that use 6D tracking devices etc.

What is needed is a system that will avoid tool palette round trips for such limited input device systems.

SUMMARY OF THE INVENTION

It is an aspect of the present invention to provide an interface that tracks a position of a cursor or transducer tracking symbol.

It is another aspect of the present invention to provide a movement tracking interface that allows the user to select functions within the interface without large movements of the transducer.

It is a further object of the present invention to optionally allow a user complete visibility of a scene when performing a selected function but have the tracking interface available at the cursor when needed.

The above aspects can be attained by a system that includes a tracking menu that tracks the movement of a positions transducer, such as a stylus or a mouse, as the transducer is moved about. The menu includes a tracking symbol, such as an arrow or cursor, positioned corresponding to inputs from transducer as moved by a user. A mobile tracking region is also included. This tracking region has a boundary enclosing the tracking symbol where the tracking symbol is movable within the boundary. The tracking region moves in correspondence to the tracking symbol when the tracking symbol encounters or bumps against the boundary while moving. The tracking region also has controls or buttons that are activatable when the tracking symbol is over or corresponds to the controls. When a stylus is used as the transducer, the menu tracks the stylus as it moves above a display and the controls are activated when the stylus touches the display at a control. When the stylus moves out of tracking range, the menu stops tracking. When the stylus returns to tracking range the menu jumps to the new position of the stylus on the display. The tracking menu can take many shapes and the tracking region need not coincide with the visible boundary of the menu. Stylus functions can performed, such as painting, when the stylus touches the display in a region not corresponding to a control and the menu becomes invisible while tracking during function execution. Stylus functions can also be performed, such as pan/zoom, when the stylus moves over the display.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 depicts a tracking menu according to the present invention.

FIGS. 2a-2c illustrate behavior of the tracking menu.

FIG. 4 depicts events associated with a stylus and tablet.

FIGS. 6a-6f depict features of a tracking menu.

FIGS. 8a and 8b depict a tracking menu with a pin capability.

FIGS. 13a-13c depict a tracking menu deforming during movement.

DETAILED DESCRIPTION OF THE PREFERRED EMBODIMENTS

Figure 3B:
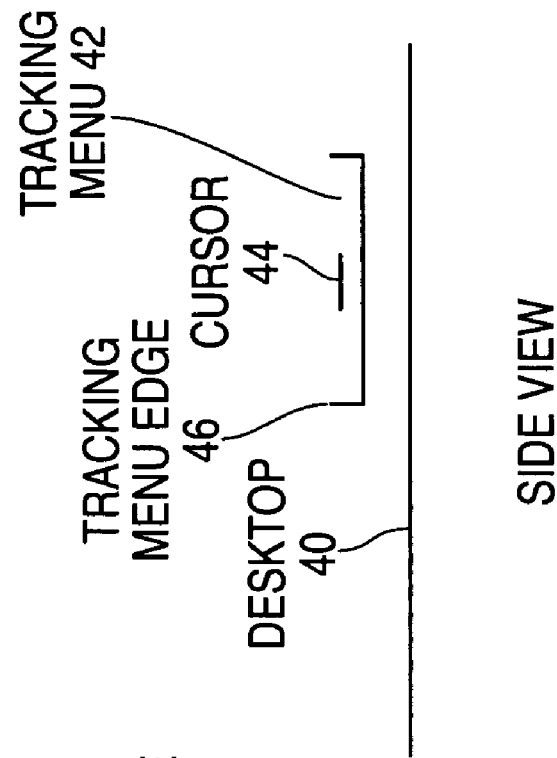
FIG. 3 illustrates components of the tracking menu.

The present invention is directed to an interface that tracks the movement of a stylus, finger, mouse, etc. and allows the user to switch tools without the need to move to a typical display menu, such as a menu bar at a top of a display. This interface is called a tracking menu. A tracking menu 10, as depicted in FIG. 1, is a graphical user interface (GUI) that includes mobile tracking region 11 typically having a cluster of controls or graphical buttons 12 and 13, and as with traditional menus, a tracking symbol or cursor 14 can be moved within or over the menu to select and interact with items, such as the buttons. However, unlike traditional menus, when the cursor 14 hits or crosses an edge or boundary 15 of the tracking region 11 of the menu 10, the menu 10 moves to continue tracking the cursor 14. Thus, the menu 10 always stays under the cursor 14 and close at hand. The tracking menu is invoked and dismissed in the same manner as a traditional modal tool by clicking on a tool palette or menu item.

FIG. 2a shows an arrow shaped tracking symbol type cursor 14 moving within the menu 10 in the mobile tracking or exterior region 11 from the position depicted in FIG. 1 to a new position along a path depicted by the cursor trail 16. FIG. 2b shows the movement of the cursor 14 continuing to move along a path depicted by trail 18 over button 13 where the button 13 is conventionally highlighted. FIG. 2c shows the movement of the cursor 14 along a path depicted by cursor trail 20 until the cursor 14 encounters a right boundary or edge 22 of the menu 10 which results in the menu 10 moving to the right as the cursor 14 keeps moving to the right, as depicted by the menu object trails 24. As a result, the menu 10 also tracks the position of the transducer and is itself a tracking symbol or a mobile control.

The behavior of the tracking menu 10, as discussed above, can be understood by a simple analogy. Consider moving a jar lid with the tip of a pencil. This can be done in two ways. The first simple way is that the pencil can be pressed down into the lid with sufficient force that the lid dragged as the pencil is moved. In this motion the point of contact with between the lid and the pencil does not change. The second way, which is used in the tracking menu of the present invention, is by moving the pencil in the air above the lid with the pencil inside the edge of the lid and moving the lid when the pencil contacts the sides of the lid. This results in the ability to move the lid without pressing down. Note that the pencil can be moved within the lid as well and the lid will remain stationary if the sides are not contacted.

Figure 3A:
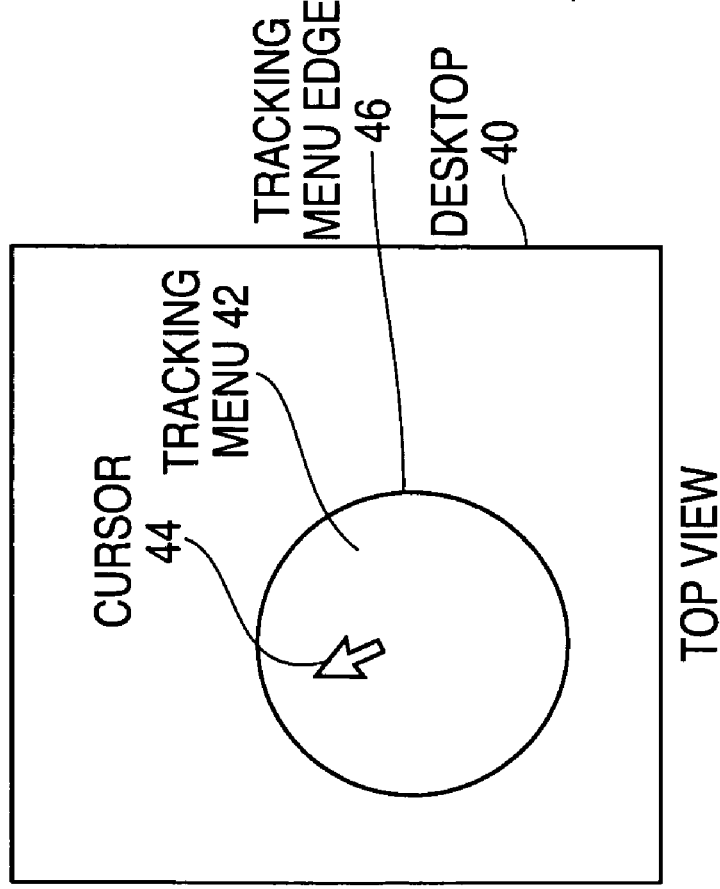

From the lid analogy point of view, with respect to a graphic desktop 40 (see FIG. 3) the tracking menu 42 of the present invention has several components as depicted in FIG. 3. The cursor 44 is allowed to move or float inside the menu 42 until it encounters a tracking menu edge 46 at which point the menu 42 tracks the cursor 44 until the cursor moves away from the edge 46.

The present invention preferably activates and controls tracking menus using the conventional multiple input states sensed by pen computers (or using regular mouse events in standard keyboard and mouse configurations). FIG. 4 illustrates the pen input states sensed by a conventional tablet PC 60 and used by the present invention. When the stylus or pen 62a is more than approximately 1.5 cm above the tablet surface 64, it is out-of-range 66 and the Tablet PC system does not track the location of the pen 62. When the pen 62b is moved closer, the tablet tracking system 60 begins tracking 68 the tip of the pen 62b and the cursor (not shown) on the display of the tablet 60 follows the tip of the pen. Finally, touching 70 occurs when the pen 62c contacts the tablet surface 64 and the tablet system 60 detects the touching.

Figure 5:
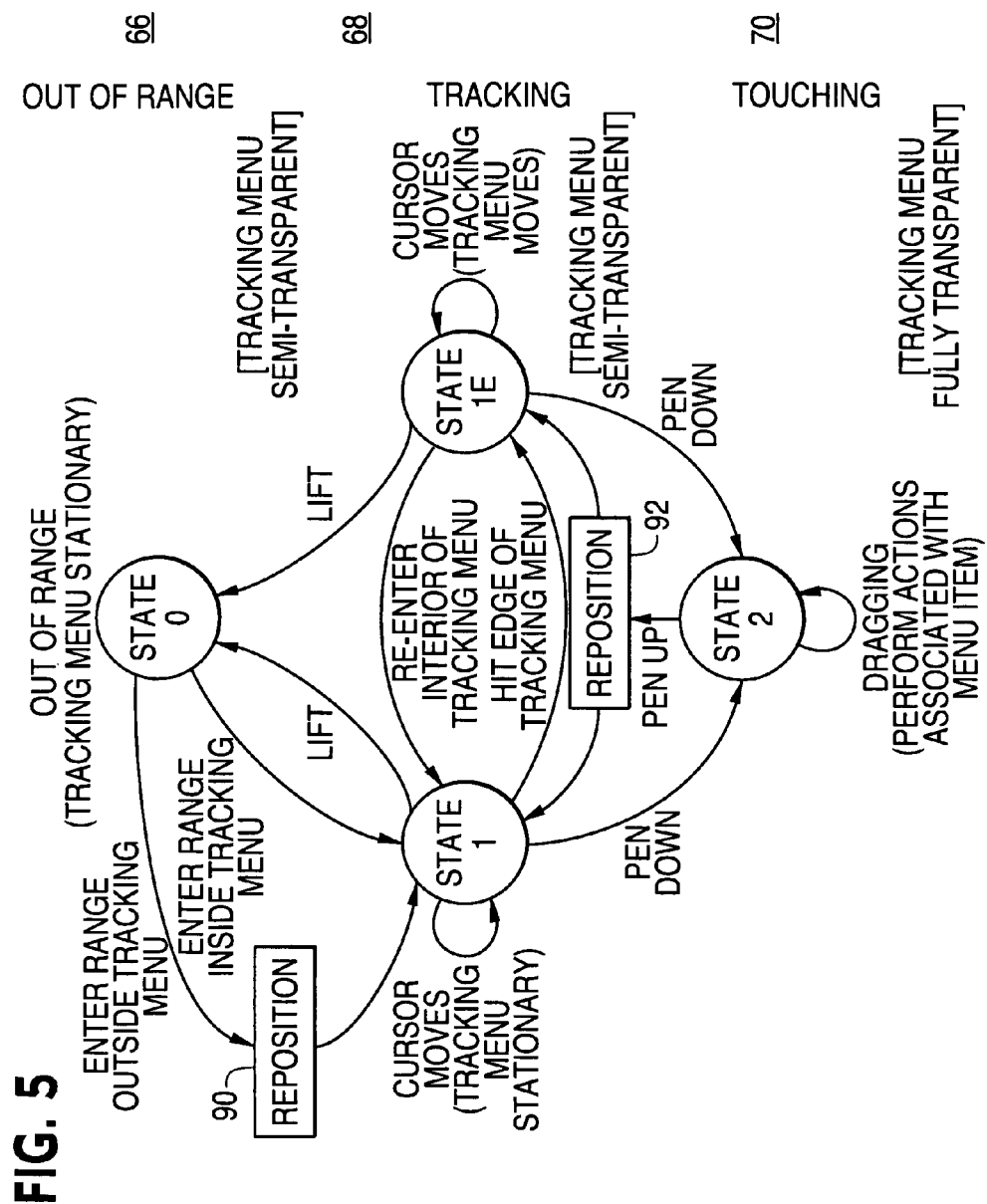
FIG. 5 is a state diagram of the tracking menu.

The operation of the tracking menu of the present invention can be understood using a state diagram as depicted in FIG. 5. In state 0 the pen is out-of-range (66) of the tracking system of the tablet PC and the tracking menu is visible (preferably semi-transparent) and is positioned in the last place it resided before the pen moved out-of-range or in an initial position if the tracking menu has just been invoked. The state 0 is entered from states 1 and 1E when the pen is lifted from the tablet and moved out-of-range. Preferably the menu resides in this last position until the pen is brought back into range and the tablet PC begins tracking (68) the pen. However, the menu could continue moving even when the stylus is out of tracking range (e.g., a "momentum" algorithm could be used where the menu moves as if it were floating in a viscous fluid and when force no longer is being applied, eventually slows down).

The pen can move into tracking range and enter state 1 in two different ways. In the first into-range transition, the pen comes down at a position where the tip of the pen is outside of the tracking menu edge (46). When tracking starts in this condition, the menu is moved or repositioned 90 so that the cursor is inside the menu edge. This involves conventionally redrawing the semi-transparent menu at a position corresponding to cursor. This repositioning or redrawing can place the menu such that the menu is moved the minimum distance to place the cursor just within the edge of the menu or a least Euclidean distance from the prior position. Or the repositioning can place the menu at an arbitrary position under the cursor, such as positioning the menu with the pen tip in the center of the menu. The second into-range transition occurs when the pen tip comes into range while it is within the boundary (46) of the tracking menu.

In state 1 the cursor moves freely about within the menu and the menu stays stationary. During this movement of the cursor within the menu, the system performs conventional operations, such as highlighting buttons or controls over which the cursor passes by comparing the position of the cursor to positions of the buttons. However, if the pen is lifted out-of-range the state moves to state 0 (pen tracking becomes inactive), if the pen encounters an edge as it moves, state 1E is entered and if the pen touches the tablet state 2 is entered.

To enter state 1E the position of the cursor is conventionally compared to the position of the edges of the tracking menu. When a match occurs, the cursor has hit the edge and the state 1E is entered. In state 1E, as long as the cursor is at or in contact with an edge as the cursor moves, the tracking menu (semi-transparent) is moved along with the cursor. That is, as the cursor is moved, the menu is conventionally redrawn with the cursor at the edge of the tracking menu. In state 1E, if the pen is lifted out-of-range the state moves to state 0, if the pen moves away from an edge to reenter the interior of the menu the state moves to state 1 and if the pen touches the tablet, state 2 is entered.

As discussed above, state 2 is entered when the pen touches (70) the tablet surface while in state 1 or state 1E. In this state the pen can be active or activated such that it will cause some function to be performed. It is also possible there could be no functionality assigned to this region of the tracking menu. Here the tracking menu may not even change its appearance. In state 2 the active pen can be selecting a button, in which case the function of the button is performed, such as selection of a new tool. Or the active pen can be moving while under the control of a previously selected function, such as painting with a previously selected paintbrush or zooming based on a previous selection of a zoom tool/function. In state 2, the tracking menu can be made fully transparent or "disappear". (When in state 2, it is optional whether the tracking menu "disappears". Instead the visuals of the menu can change, for example, button highlighting changes to indicate it is pushed in or a check box toggles). In this state, the system can continue to reposition the fully transparent menu under the cursor or preferably the menu can be allowed to remain in it's last position as in state 0 (note the user would not perceive a difference between these two alternatives). When the pen is lifted from the tablet surface and contact with the tablet ends, the tracking mode 68 is again entered and the menu is repositioned 92 depending on the last state. If the pen is lifted when the prior state is state 1E, the pen is repositioned 92 at the last edge point of state 1E. If the pen is lifted when the prior state is state 1, the pen is repositioned 92 at the last interior point of state 1. The above discussed repositioning strategies are best practice or preferred. Other practices may be employed depending on the application of tracking menus. For example, repositioning a tracking menu within a spreadsheet application may reposition into the nearest spreadsheet cell or row/column. Other strategies may have the tracking menu always appear at the top-left of the screen.

When using a mouse, the same set of state transitions apply except that out-of-range (state 0) does not occur. Rather than state 0, the system includes the functionality of directly jumping to a new screen position. However, this result can also be achieved by moving the tracking menu in state 1E. Thus, tracking menus work both with a pen and a mouse.

FIGS. 6a-6f visually depict the operations discussed above. FIG. 6a depicts a tracking menu in an initial state where the user selects a pencil tool by moving the cursor 82 over the pencil button 84 and performing a pen down. In FIG. 6b the pencil tool is assigned to the exterior region of tracking menu 80 and the cursor 82 changes to a pencil icon. In FIG. 6c the user places the pen/pencil down, touching the table PC surface while in the exterior region 80 and the tracking menu becomes invisible. At this point, a pencil drag operation is performed that results in making a mark 86. In FIG. 6d the tracking menu 80 reappears on a pen-up event and the menu 80 is repositioned under the cursor 82. In FIG. 6e the user selects a second tool, the flood fill tool. In this example, the exterior region of the tracking menu is divided or split into two regions 90 and 92 by providing conventional user enabling assignment controls for each side. When cursor moves to the left side of the tracking menu as shown in FIG. 6f, the pencil tool is enabled and cursor changes to the pencil icon. Conversely, when the cursor moves to the right side, flood fill tool and corresponding icon are activated.

An alternate approach to describing the operations of the present invention and one that also describes additional features of the invention is set forth below with respect to FIGS. 7, 9 and 10.

Figure 7:
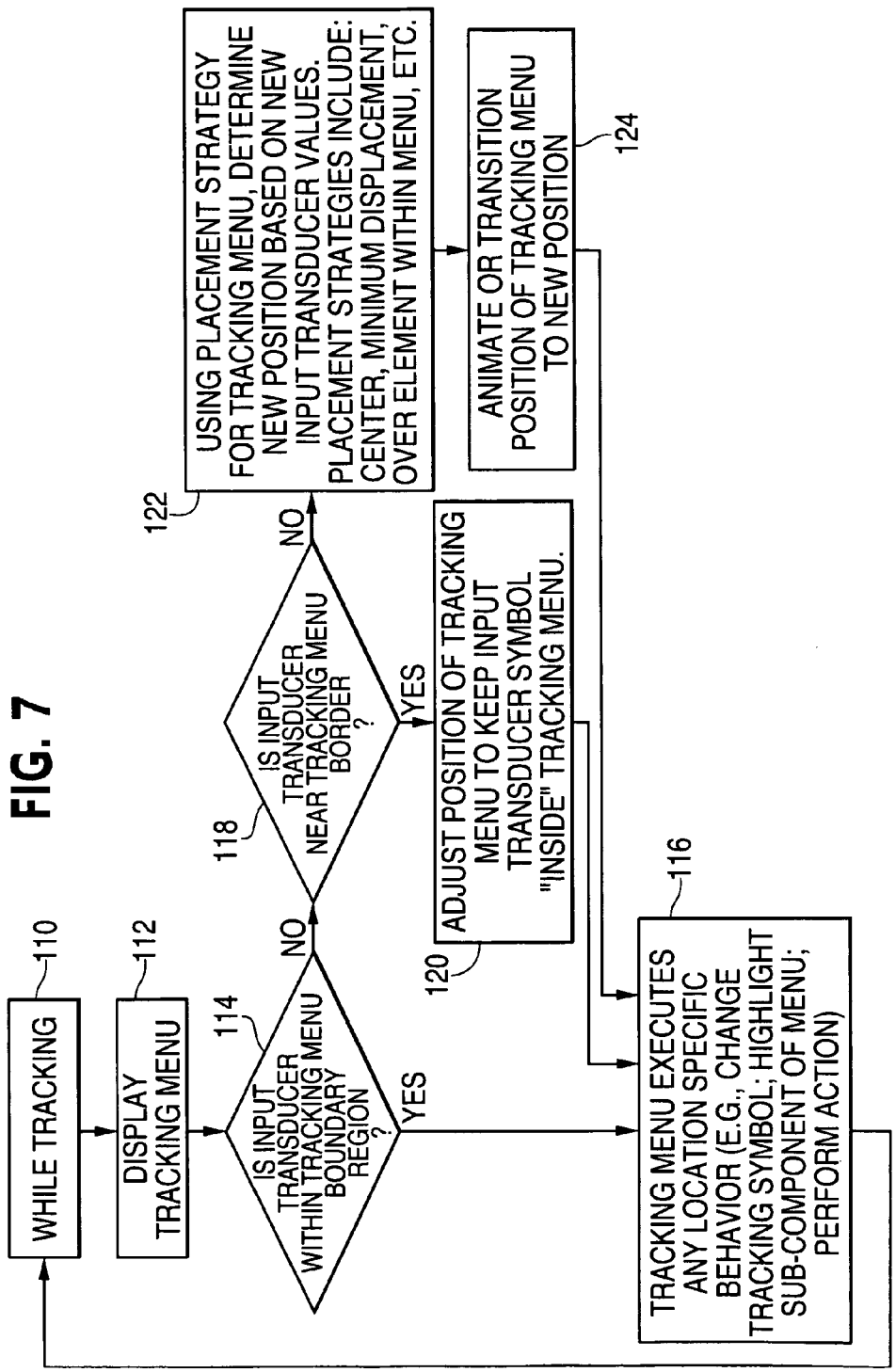
FIG. 7 illustrates tracking operations.

Tracking operations are described with respect to FIG. 7 and these operations are performed while the tablet PC or conventional PC is tracking 110 the position of an input transducer, such as a stylus or mouse respectively, during which the tracking menu is displayed 112. As the transducer is moved, the system determines 114 whether the display location associated with input transducer is within the boundary of the tracking menu. If so, the system executes 116 any location specific behavior that is active. If not, the system determines 118 whether the display location is near the menu border. If so, the position of the menu is adjusted 120. If the location is not near the border, the new menu placement position is determined 122 based on a predetermined placement strategy. The strategies include the centering and minimum displacement strategies previously discussed and the positioning of the menu so that the cursor is over a specific button or element of the menu. Once the new position is determined, the menu is moved 124 to the new position where the movement could be a jump, animation or some other form of transition. Additional tracking operations with respect to state 2 are described below with respect to FIG. 10.

Depending on the user's workflow, it may be desirable to separate the cursor from the tracking menu. For example, a user may desire the ability to rapidly switch between the pan-and-zoom tool and a drawing tool. To accommodate this type of feature, the tracking menu 130 as depicted in FIGS. 8a and 8b includes a pushpin. When the user selects the pushpin button 132, the tracking menu 130 is temporarily deactivated, remaining posted and stationary; and it grays out to indicate the inactive state (see FIG. 8b). The cursor 134 can now leave or pass over the tracking boundary edge 136. The next time the cursor 134 travels into the tracking menu 130 the pushpin is automatically released and the tracking menu 130 behaves normally (i.e., moving when the cursor hits the tracking border). A lock, which can also be implemented with a corresponding icon, explicitly pins the tracking menu and does not release the menu until the lock is explicitly selected again, even when the tracking symbol 134 crosses into the menu 130.

Figure 9:
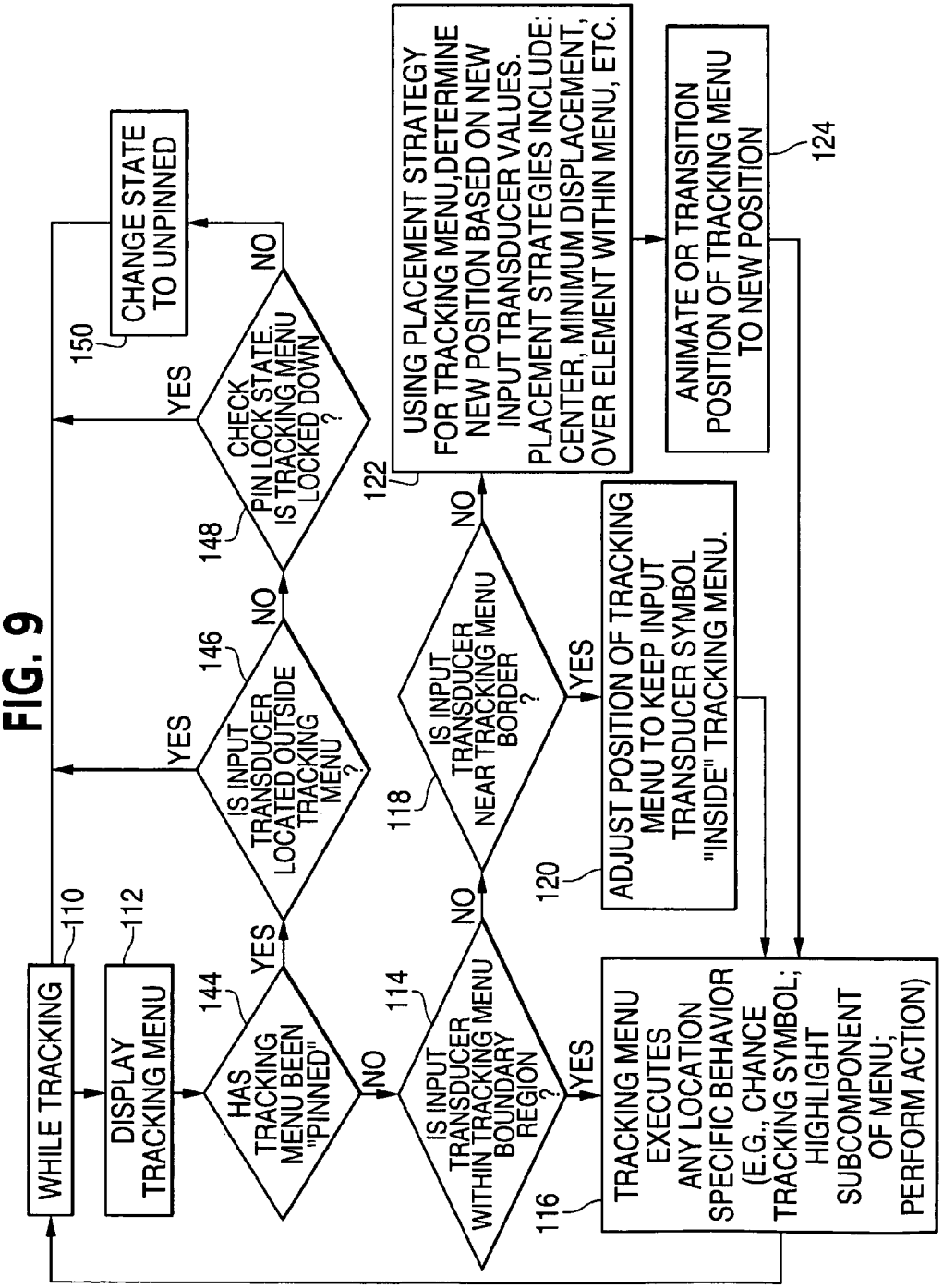
FIG. 9 depicts tracking operations including pinning.

FIG. 9 depicts the tracking operations of FIG. 7 and also includes operations that allow a menu to be pinned (and locked) in place. During the tracking and display of the menu the system determines 144 whether the menu has been pinned. If so, the system determines 146 whether the transducer display location is outside of the boundary of the menu. If so, no change in the pinning mode is made. If the location is outside the menu, tracking of the display location of the transducer (cursor) while the menu is pinned continues. If the location is inside the menu, the system checks 148 to see if the menu is locked down. If so, tracking while the menu is pinned continues. If the menu is not locked down, the menu is unpinned 150 and then tracking resumes where the menu follows the position of the cursor.

Figure 10:
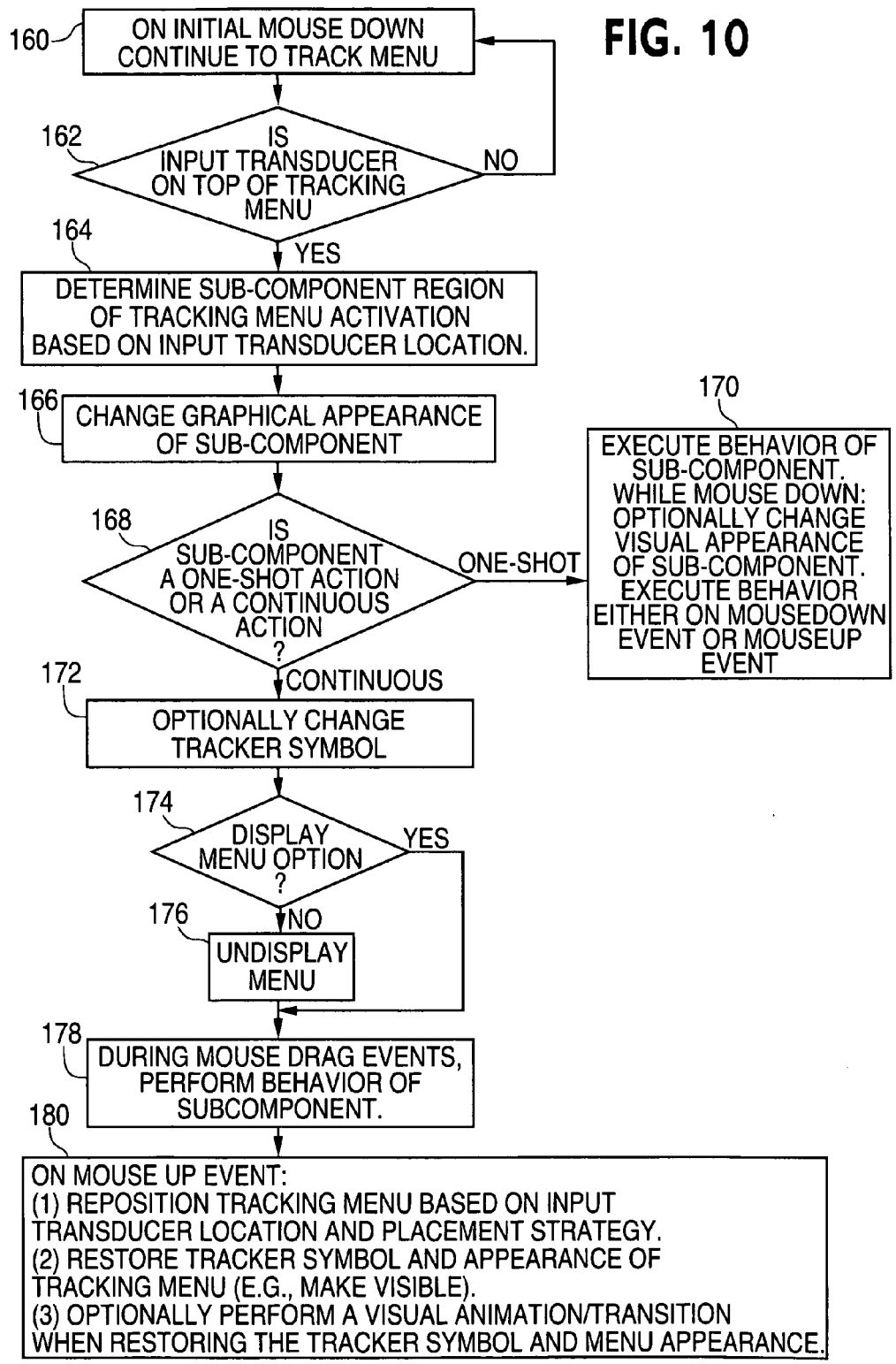
FIG. 10 depicts tracking operations with a mouse having a tracking symbol.

FIG. 10 illustrates tracking operations that occur when a mouse is being used and continuous or one-shot events are activated by a mouse down or a mouse button activation event is detected. Tracking of the display position of the mouse cursor, such as an arrow, occurs 160 and continues even when a mouse down (button activation) occurs. When a mouse down event occurs, the system determines 162 whether the location is on the menu. If so, the system determines 164 the subcomponent of the menu associated with the cursor location and changes 166 the appearance of the subcomponent, such as by changing in the appearance of a button to indicate that it has been activated. If the subcomponent activated by the mouse down event is a one-shot type of control 166, the system performs the operation responsive to the down event or responsive to an up event where the mouse button is released. The appearance of the control can be changed to show that the one-shot operation is being performed. Once the operation is performed the system returns to tracking and menu display (not shown). If the selected control is a continuous operation type control, the continuous operation is activated and the tracking symbol can be changed 170 to reflect the change in mode. During continuous operation activation, the user menus can be displayed or not responsive to a preset menu display option. The system tests 174 for this option and redraws 176 the display without the menu if the option is active. The system then performs 178 the continuous operation of the activated control as the cursor is moved. On a mouse button up event 180, the menu is repositioned, the tracking symbol or cursor is restored if it has been changed and the menu can be animated to transition to its new location.

Figure 11C:
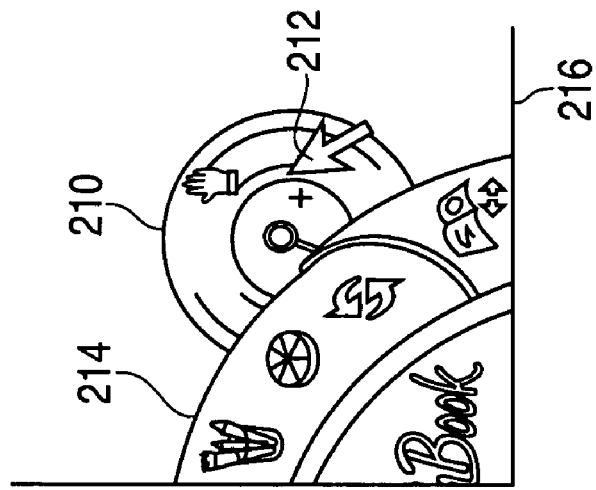
FIGS. 11a-11c depict behavior of a tracking symbol with a persistent object.
Figure 11B:
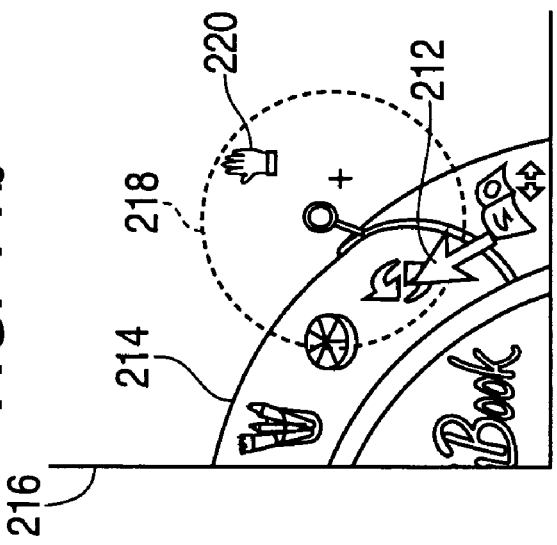
Figure 11A:
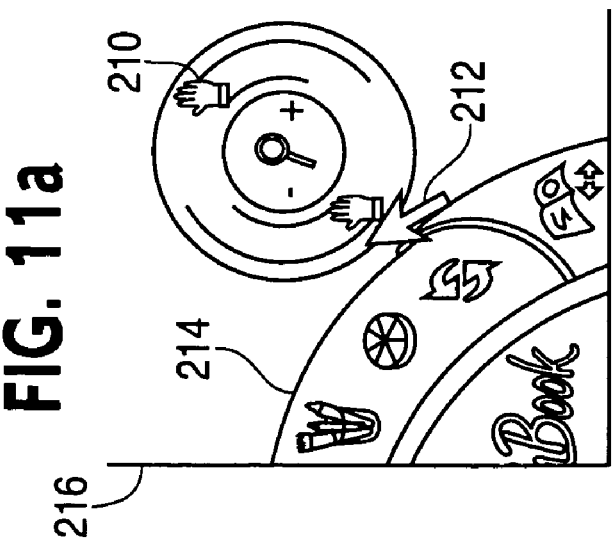

When the tracking menu is moved about in the display it is preferably drawn (semitransparent) on top of most other objects in the display, such as a model being drawn or manipulated. However, some objects in the display space take precedence over the tracking menu. For example, an operating system menu bar at a top, side or bottom of a display may need to be persistently displayed even when the tracking menu moves into the display space of the menu bar. In such a case it is preferred that the tracking menu change to a display state in which the presence of the menu is graphically shown but the predominance of the persistent object is apparent. An example of such a preference is shown in FIGS. 11a-11c. FIG. 11a depicts a pan-zoom type tracking menu 210 being moved (dragged) by cursor 212 toward a persistent menu 214 in a corner of a display 216. The tracking menu 210 is displayed or drawn showing the complete graphics of the menu. When the cursor crosses the boundary of the persistent menu 214, as depicted in FIG. 11b, the tracking menu is converted into an x-ray, shadow or outline type menu 218. This menu display mode displays an outline 218 of the menu over the persistent object (214) and within the display space not occupied by the persistent object, if necessary, to provide the user with a visual impression of the tracking menu existence. This also can provide the impression of the tracking menu sliding under the persistent object. This outline menu 218 can also depict graphic symbols of the tracking menu in outline form or in non-outline form to assist in this visual impression. For example, FIG. 11b shows a pan control symbol 220 in non-outline form. While the tracking menu is in the outline mode any events initiated by the transducer, such as a touch of the display by a pen or a mouse down event are interpreted as events for the persistent object 214 and provided to a control process of the persistent object. As a result, the tracking menu process enters a non-tracking condition similar to the out-of-range condition 66 previously discussed. When the cursor 212 moves back outside the persistent object (214), as depicted in FIG. 11c, the display mode for the tracking menu changes back to the non-outline or complete graphic mode menu 210 where the graphic details of the tracking menu are shown. This can appear as if the tracking menu is sliding out from under the persistent object. The menu acts like the transducer has come within range and tracking begins (68) with the menu being positioned responsive to the placement strategy in effect. In this exit operation, the persistent menu is drawn last so that portions of the tracking menu "under" the persistent object are not shown or the overlap portion of the tracking menu 210 is clipped.

Note that when the transducer is over the persistent object and the tracking menu is underneath the persistent object, events can also be first processed by the persistent object and, optionally, passed through to the tracking menu for it to process. In addition, the persistent object can be used to re-assign functionality to the underlying tracking menu since the objects are stacked. For example, in FIG. 11b, if the user wanted to assign the outer region of the tracking menu, which, for example, is currently the pan tool, to a different tool, say, the "reverse" tool, the user could move the tracking menu under the persistent object and the act of selecting the "reverse" tool would assign the functionality to the tracking menu region below the current cursor location.

Figure 12:
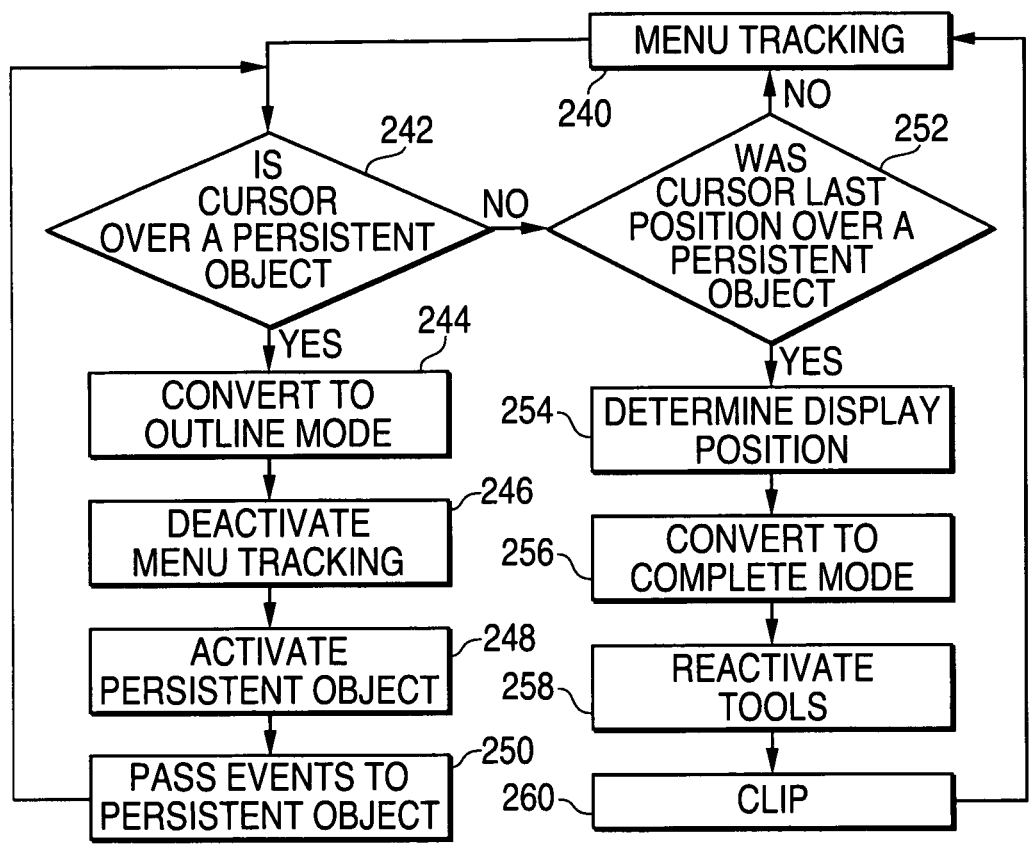
FIG. 12 depicts operations associated with a persistent object.

FIG. 12 depicts the operations of the outline menu process discussed above. While menu tracking is being performed 240, the system determines 242 whether the cursor has moved over a persistent object. If so, the tracking menu is converted 244 to the outline mode, followed by deactivating menu tracking 246 and activating the persistent object, such as a menu 214. Then all transducer events are passed 250 to the persistent object process until the cursor travels back outside the persistent object. When the cursor is detected as being not over the persistent object, the system determines 252 whether the previous position of the cursor was over the persistent object. If this condition exists, the cursor has moved out of the persistent object and the position of the display location is determined 254 and a placement strategy is invoked. The tracking menu is converted 256 into the complete graphic display. The tools of the tracking menu are activated 258 and events are no longer sent to the persistent object process resulting in the persistent object being deactivated. The tracking menu is then clipped 260 as needed and tracking 240 resumes.

As noted above, when the tracking menu encounters a persistent object the menu can be made to appear to slide under the persistent object. It is also possible to deform the tracking menu as it encounters a persistent object or a display edge or corner. FIGS. 13a-13c depict a tracking menu having a graphic in the form of a mouse 250 with a circular tracking boundary 252 deforming as it is dragged to the right (FIG. 13b) and then being deformed to fit a corner 254. This deformation will allow the tracking menu to be used throughout an available space of a display.

While moving the tracking menu in the tracking input state, a variety of dragging algorithms can be employed. The above discussion describes the simple physical approach that moves the tracking menu at the point of cursor contact with the tracking menu edge and keeps the cursor stuck at the edge until the user "backs up" a bit. Alternatively, the tracking menu process could use a different dragging algorithm such that the cursor gets attached to the tracking menu edge but can go beyond the edge and drags the tracking menu through a metaphorical string or elastic. Simulating gravity and weight for the tracking menu and imparting forces through cursor activity is possible and may add a fun factor to the technique.

Figure 14A:
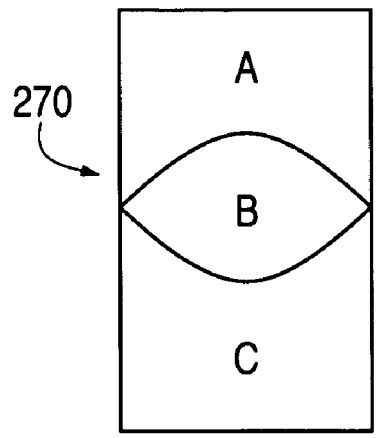
FIGS. 14a and 14b show different internal region arrangements.
Figure 14B:
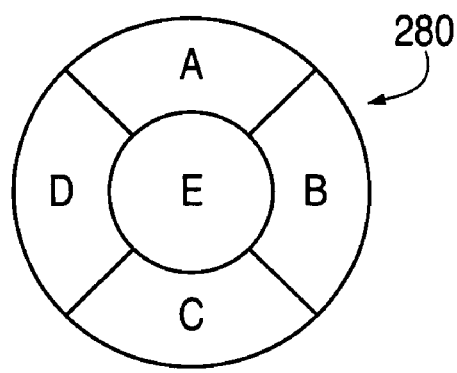

There are a variety of ways to divide the exterior region of the tracking menu as depicted in FIGS. 14a and 14b. The menus 270 and 280 of FIGS. 14a and 14b show how regions can be laid out so that some functions are easy to invoke by being placed against the edge of the tracking menu. This characteristic allows selection by direction of movement rather than only by position, such as in marking menus.

Figure 15:
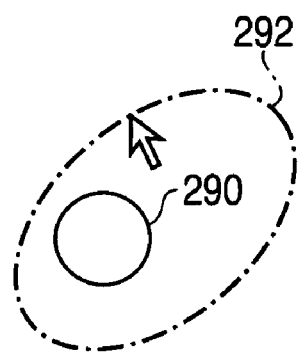
FIG. 15 depicts non-coincidence between a visible menu boundary and a tracking boundary.
Figure 18:
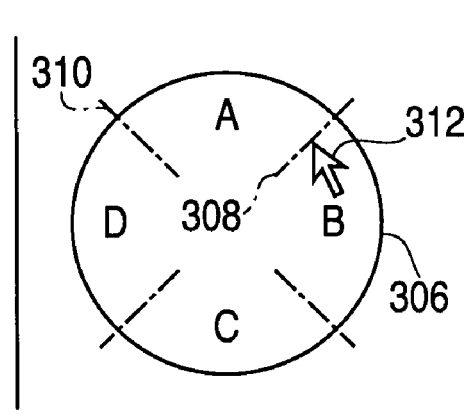
FIG. 18 shows interior tracking walls or partitions.
Figure 17:
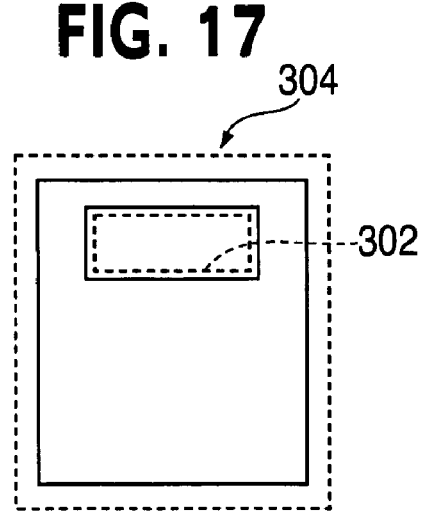
FIG. 17 shows an interior tracking boundary
Figure 16A:
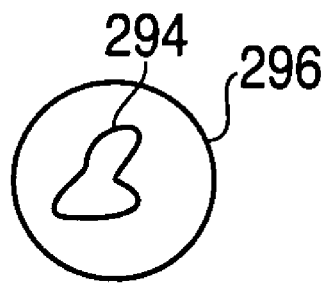
FIGS. 16a and 16b depict additional non-coincidence between visible menu boundary and tracking boundary.
Figure 16B:
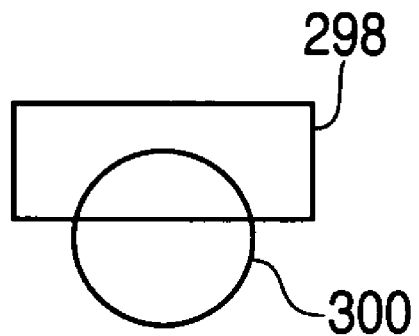
Figure 26:
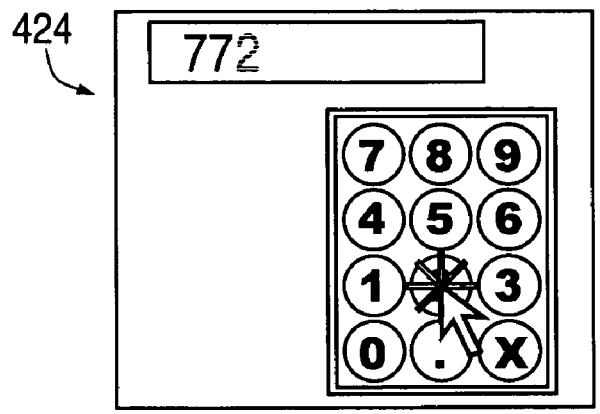

The visual boundary of the graphical representation of the tracking menu does not have to map directly to the tracking boundary as depicted in FIG. 15. The tracking boundary can have a different shape and it can be larger or smaller than the visual boundary. FIG. 15 shows a circular graphical visible tracking menu 290 with an elliptical border or edge 292. FIG. 16a shows a tracking menu in which the tracking boundary 294 is inside the visual boundary. FIG. 16b depicts a tracking boundary 298 partially inside and partially outside the visual boundary 300. Moreover, tracking boundaries can be non-contiguous. For example, there could be a hole 302 in the tracking menu 304 as depicted in FIG. 17 (see also FIG. 26) or the menu 306 can include interior tracking menu boundaries, partitions or walls 308 and 310 that jut out from the exterior boundary 306 as depicted in FIG. 18. When the cursor 312 encounters an interior wall 308, the menu 306 behaves as if it has encountered an edge and the menu is moved when the cursor "pushes" against the wall. Interior walls may be useful to bias the space and allow the cursor to remain in a sub-region more easily. A wall can be used to rotate the menu like a track ball type operation by pushing against the wall and moving in a circular direction. This rotation can also be produced without a wall if the edge is made "sticky".

Figure 19:
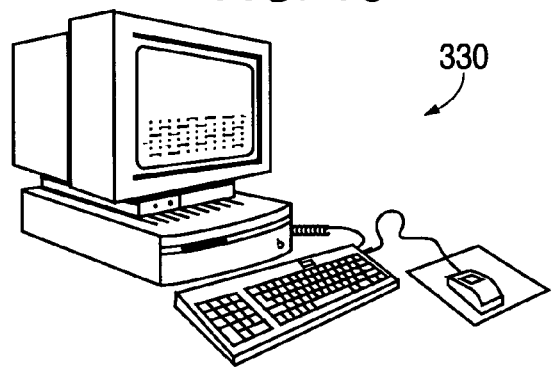
FIG. 19 shows a desktop PC as hardware of the present invention.
Figure 20:
FIG. 20 depicts a tablet PC as hardware of the present invention.
Figure 21:
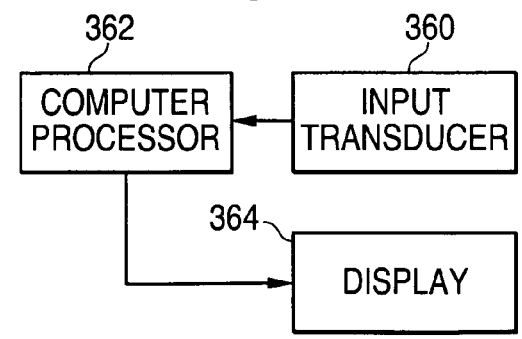
FIG. 21 shows components of the hardware of the present invention.

The hardware of the tracking menu system can be within desktop PC 330 (see FIG. 19) or within a handheld device, such as a tablet PC 340 (see FIG. 20) or a PDA, and includes an input transducer 360 the position of which is tracked by a computer 362 that processes the transducer positions and creates the tracking menu display that is presented on a display 364 as shown in FIG. 21.

Figure 22:
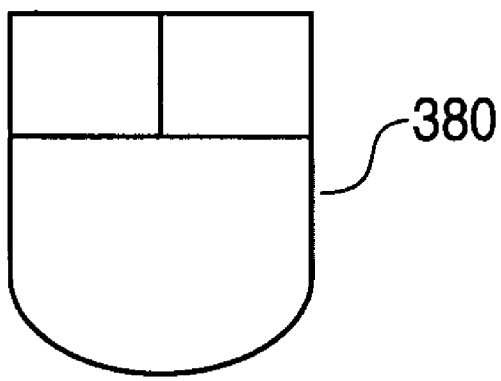
FIG. 22 shows a mouse shaped tracking menu.
Figure 23:
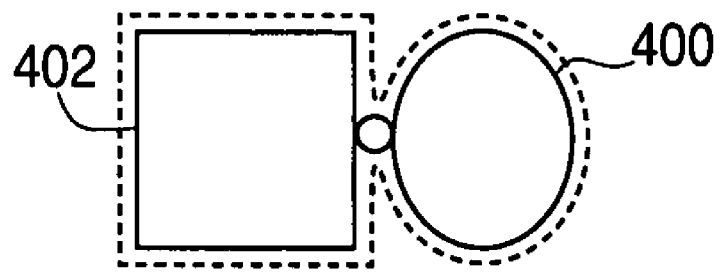
FIG. 23 shows composition of two tracking menus.
Figure 24:
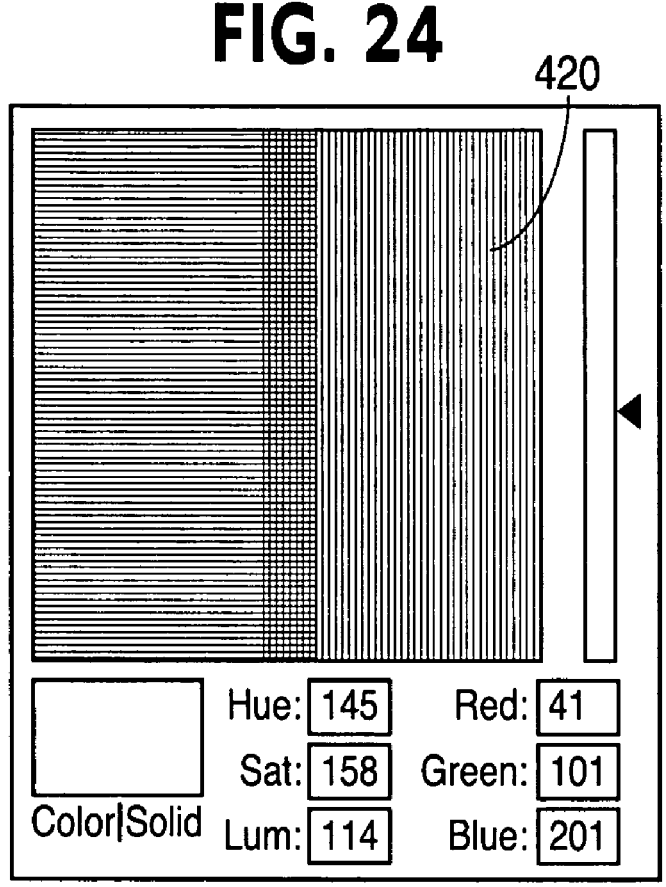
FIGS. 24, 25, 26, 27, 28, 29 and 30 show color palette, linear, numeric pad, graffiti, keyboard, marking tracking menus, and 3D view controls, respectively.
Figure 25:
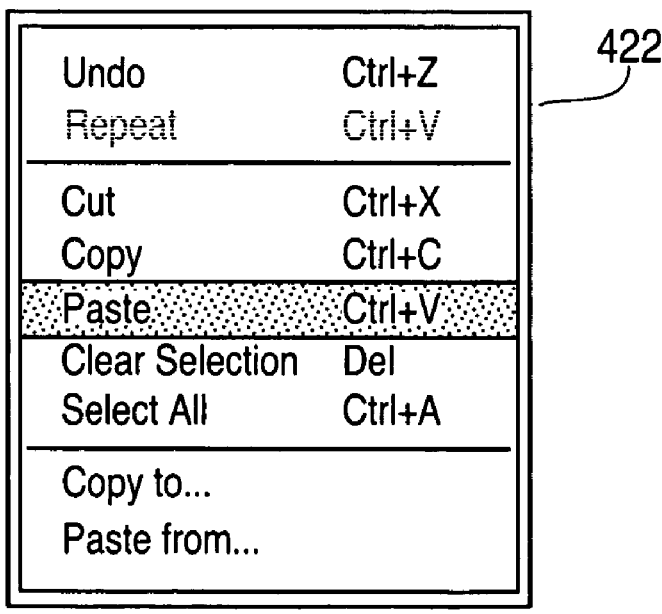
Figure 27:
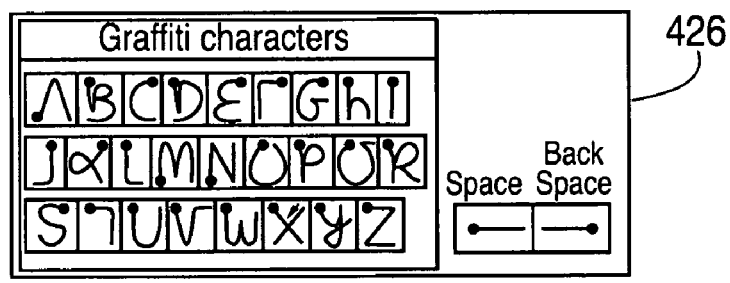
Figure 28:
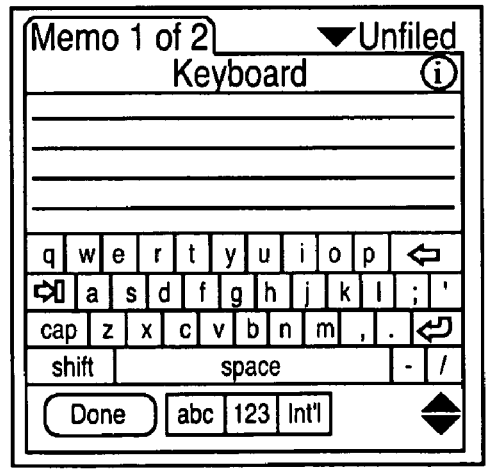
Figure 29:
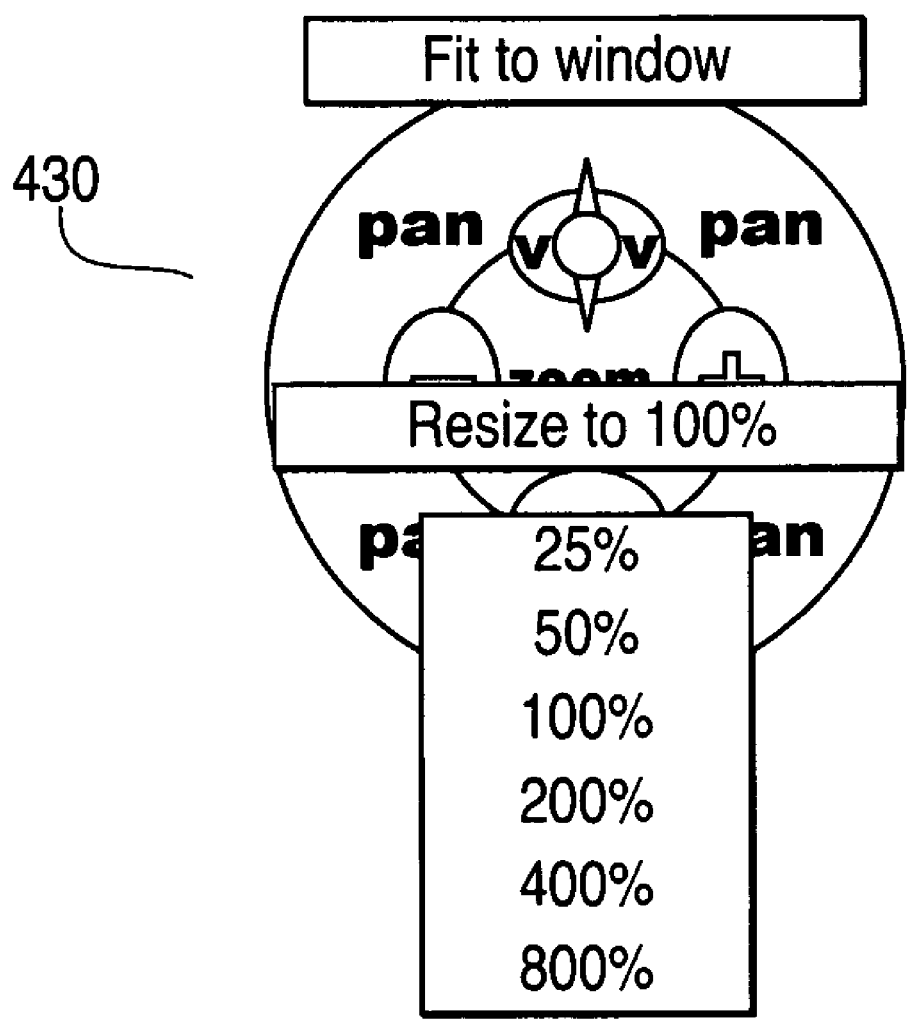
Figure 30:
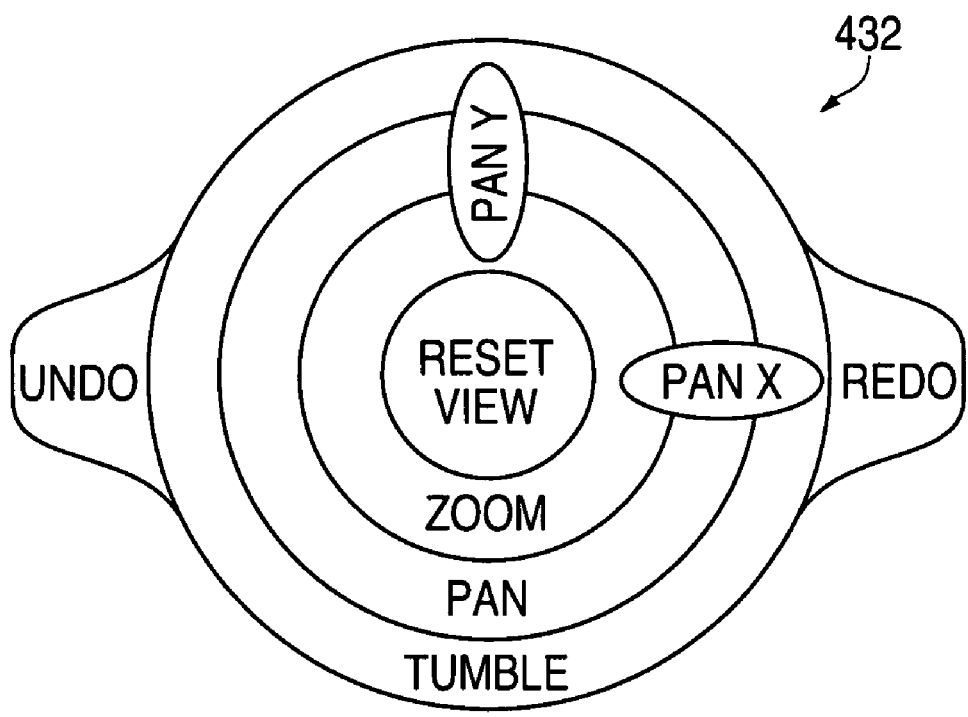

The tracking menu of the present invention can take a number of different shapes with correspondingly different functions and capabilities. As discussed above, the tracking menu can have a circular shape and perform as a pan-zoom tool. A pan-zoom tool tracking menu is described in more detail in the related application noted above. The tracking menu can also take the shape of and act as a mouse or pen-mouse 380 as discussed above and depicted in FIG. 22. A pen-mouse tracking menu is described in more detail in the related application noted above. Two or more tracking menus 400 and 402 can be composed, attached or combined as depicted in FIG. 23. Tracking menus can allow non-uniform movement of the tracking symbol within the menu or can snap to interior grid lines during movement. A tracking menu can be a color pallet 420 including a cross-hair tracking symbol, as depicted in FIG. 24. A tracking menu can take the form of a linear menu 422 as depicted in FIG. 25. A tracking menu can be various versions of a numeric pad such as a calculator 424 where input events over number buttons send numbers to the numbers field and input event events over operations, such as add ("+") cause a corresponding operation (see FIG. 26). A tracking menu can be a graffiti input GUI 426 as in FIG. 27 or a display keyboard with an input region 428 as depicted in FIG. 28. The tracking menu can also include a marking menu 430 activatable by an embedded button as depicted in FIG. 29. FIG. 30 shows a tracking menu 432 for controlling the position and orientation of a viewpoint in a 3D scene. Typically, this is called a 3D virtual camera and involves several separate tools for panning, zooming, and tumbling (orbiting the camera about the center of the 3D scene). Furthermore, there are other types of camera movements that can be used such as roll, yaw, and pitch. These controls form a cluster of functionality that can be made available via a tracking menu. FIG. 30 shows a tracking menu where the most frequently used camera control (tumbling) is given priority in the design by being placed in the large outer region. Additional, less frequently used commands are placed appropriately in smaller regions thus reducing the chance of accidental engagement. Note that this design explores the usage of three permeable zones (reset view, undo and redo). Here the user must dwell over the region border with the cursor and after some time (approximately half a second) may enter and activate the zone. This provides a way of offering functionality within the tracking menu but at a reduced level of accessibility.

The functionality assigned to a particular region can change based on where the tracking menu is on the screen and specifically when it is over an object (i.e., context sensitive). For example, consider a pan-and-scale tracking menu. It looks similar to the pan and zoom menu (or widget) except the center zone performs an object scaling operation. If the center zone is near the object's corners or center of the object, it does a proportional scale of the entire object (e.g., both x and y). If the center zone is near an edge, it scales in that direction only (e.g., only x or only y). The system detects the position of the menu, compares the menu position to object position and changes the functionality of controls accordingly.

The present invention has been described with respect to the use of the invention with tablet type personal computers. It is also possible to use the present invention with other types of display systems, such as large format displays (plasma screens and projectors; front/rear projection; horizontal and vertical surfaces)—for example, white-board applications.

The system also includes permanent or removable storage, such as magnetic and optical discs, RAM, ROM, etc. on which the process and data structures of the present invention can be stored and distributed. The processes can also be distributed via, for example, downloading over a network such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A graphical user interface display, comprising:
a tracking symbol positioned corresponding to an input transducer movable by a user when the input transducer is in a tracking state; and
a menu, on the graphical user interface display, having a menu boundary and comprising a mobile tracking region having a region boundary coincident with the menu boundary and enclosing the tracking symbol with the tracking symbol being movable within the region boundary when the input transducer is in the tracking state, the mobile tracking region moving in correspondence to the tracking symbol when the input transducer is in the tracking state and when the tracking symbol encounters the region boundary while moving, the mobile tracking region having controls with boundaries and activatable when the input transducer is in a down state and the tracking symbol is over the controls, and the menu is always visible when one of the controls is not activated and always not visible when one of the controls is activated.

2. A graphical user interface display as recited in claim 1, wherein the mobile tracking region comprises the menu having a visible menu edge.

3. A graphical user interface display as recited in claim 1, wherein the mobile tracking region comprises one of a linear menu, the menu with an embedded marking menu, a tool palette, a color palette, a pan-zoom tool, a pen-mouse, a keyboard, a numeric pad, one or more buttons, sliders, checkboxes, pull-down menu, a dialog box, and an alternative view.

4. A graphical user interface display as recited in claim 1, wherein the controls of the mobile tracking region further comprise a control changed in appearance when the tracking symbol is in the down state over the control.

5. A graphical user interface display as recited in claim 1, wherein the mobile tracking region is semi-transparent when the tracking symbol is inactive and transparent when the tracking symbol is active.

6. A graphical user interface display as recited in claim 1, wherein the tracking symbol can be activated by the user and performs a selected function when active.

7. A graphical user interface display as recited in claim 6, wherein the selected function is performed when the tracking symbol is active.

8. A graphical user interface display as recited in claim 6, wherein the input transducer corresponds to a stylus, the tracking symbol and mobile tracking region are displayed on a tablet display, and the tracking symbol is in the down state when the stylus touches the tablet display.

9. A graphical user interface display as recited in claim 8, wherein the tracking symbol is inactive when the stylus is not touching the tablet display.

10. A graphical user interface display as recited in claim 6, wherein the input transducer corresponds to a mouse having a mouse button, the tracking symbol and mobile tracking region are displayed on a tablet display, and the tracking symbol is in the tracking state when the mouse is one of moved and in the down state.

11. A graphical user interface display as recited in claim 1, wherein the positioning corresponding to the motion of the input transducer stops under a predetermined condition and the mobile tracking region is repositioned corresponding to the tracking symbol when the predetermined condition no longer exists.

12. A graphical user interface display as recited in claim 11, wherein the repositioning positions the menu a least Euclidean distance from a prior position.

13. A graphical user interface display as recited in claim 11, wherein the predetermined condition is a stylus out-of-range condition.

14. A graphical user interface display as recited in claim 1, wherein the region boundary is maintained around the tracking symbol.

15. A graphical user interface display as recited in claim 1, wherein the tracking symbol is allowed to cross the region boundary while moving and the region boundary surrounds the tracking symbol when the tracking symbol is not moving.

16. A graphical user interface display as recited in claim 1, wherein the user designates that the mobile tracking region be held in place when the tracking symbol crosses the region boundary.

17. A graphical user interface display as recited in claim 16, wherein the graphical user interface display comprises an outline of the mobile tracking region when the tracking symbol is over a persistent object.

18. A graphical user interface display as recited in claim 17, wherein the graphical user interface display is clipped when the tracking symbol exits the persistent object.

19. A graphical user interface display as recited in claim 1, wherein the mobile tracking region deforms corresponding to a shape of a persistent object when the tracking symbol comes in a vicinity of a persistent object or display edge.

20. A graphical user interface display as recited in claim 1, further comprising an interior tracking boundary interior to the region boundary and the mobile tracking region moving in correspondence to the tracking symbol when the tracking symbol encounters the interior tracking boundary.

21. A graphical user interface display as recited in claim 20, wherein the interior tracking boundary comprises a jutting wall.

22. A graphical user interface display as recited in claim 1, wherein the graphical user interface display has a visible edge and the region boundary corresponds to one of the visible edge, outside the visible edge, inside the visible edge and overlaps the visible edge.

23. A graphical user interface display as recited in claim 1, wherein control activation requires a dwell by the tracking symbol.

24. A graphical user interface display as recited in claim 1, wherein control functionality is context sensitive.

25. An interface display, comprising:
a first tracking symbol having a first tracking symbol position controllable by a user when in a tracking state; and
a second tracking symbol containing the first tracking symbol, having a second tracking symbol position controlled by the first tracking symbol and having objects selectable by the first tracking symbol when in the tracking state and a down state, the second tracking symbol having a menu containing the selectable objects with the menu having a menu boundary and comprising a mobile tracking region having a region boundary coincident with the menu boundary, and the menu is always visible when one of the selectable objects is not activated and always not visible when one of the selectable objects is selected by the first tracking symbol.

26. An interface display as recited in claim 25, wherein the first and second tracking symbol positions correspond.

27. An interface display as recited in claim 25, wherein the objects comprise controls.

28. An interface, comprising:
a display;
a tracking menu positioned on the display, having an edge and having controls positioned in the tracking menu with the tracking menu having a menu boundary and comprising a mobile tracking region having a region boundary coincident with the menu boundary, and the tracking menu is always visible when one of the controls is not activated and always not visible when one of the controls is activated;
a tracking symbol positioned above the tracking menu, encountering the edge of the region boundary when moved and moving the tracking menu when the tracking symbol is in a tracking state when the edge of the region boundary is encountered.

29. An interface as recited in claim 28, further comprising a graphic object positioned between the tracking menu and the display.

30. An interface as recited in claim 28, further comprising a persistent graphic object positioned between the tracking symbol and the tracking menu.

31. A graphical user interface display, comprising:
a tracking symbol positioned corresponding to a stylus input transducer movable by a user; and
a mobile tracking menu region, on the graphical user interface display, having a region boundary enclosing the tracking symbol with the tracking symbol being movable within the region boundary with the mobile tracking menu region moving in correspondence to the tracking symbol when the tracking symbol encounters the region boundary while moving, the mobile tracking menu region having a visible menu edge coincident with the region boundary, the mobile tracking menu region having button controls activatable when the tracking symbol corresponds to the button controls with a control changed in appearance when the tracking symbol is over the control and is active, the mobile tracking menu region being semi-transparent when the tracking symbol is inactive and transparent when the tracking symbol is active, where the tracking symbol can be activated by the user selecting one of the button controls and performs a selected function when active, and the mobile tracking menu region is always visible when one of the button controls is not activated and always not visible when one of the button controls is activated,
wherein the tracking symbol and region are displayed on a tablet display, and the tracking symbol is activated when the stylus touches the tablet display, wherein the positioning corresponding to the motion of the input transducer stops when the stylus is out of range of the tablet display and the mobile tracking menu region is repositioned a least Euclidean distance from a prior position corresponding to the tracking symbol when a condition no longer exists, wherein the graphical user interface display comprises an outline of the mobile tracking region when the tracking symbol is over a persistent object and the graphical user interface display is clipped as the tracking symbol exits the persistent object, and wherein the mobile tracking region deforms corresponding to a shape of the persistent object when the tracking symbol comes in a vicinity of a persistent object or display edge.

32. A method, comprising:

allowing a user to move a tracking symbol on a display; and moving a tracking menu having controls in correspondence to the tracking symbol when the tracking symbol is in a tracking state and the tracking symbol encounters an edge of the tracking menu with the tracking menu always being visible when one of the controls is not activated and always being not visible when one of the controls is activated when the tracking symbol is in a down state over one of the controls.

33. A method as recited in claim 32, further comprising allowing the user to select an item in the tracking menu without moving the tracking menu.

34. A method as recited in claim 32, wherein movement of the tracking symbol is responsive to movement by the user of a stylus over a stylus sensing tablet and the moving of the tracking menu occurs when the stylus is in a tracking range of the stylus sensing tablet.

35. A method as recited in claim 34, further comprising making the tracking menu transparent when the stylus touches the stylus sensing tablet.

36. A method as recited in claim 35, further comprising performing a graphic function corresponding to motion of the stylus when the tracking menu is transparent.

37. A method as recited in claim 36, wherein the graphic function makes a mark on the display.

38. A method as recited in claim 32, wherein movement of the tracking symbol is responsive to movement by the user of a stylus over a stylus sensing tablet and further comprising positioning the tracking menu in correspondence when the stylus comes into tracking range.

39. A method as recited in claim 32, wherein movement of the tracking symbol is responsive to movement by the user of a stylus over a stylus sensing tablet and further comprising positioning the tracking menu in correspondence when the stylus ends contact with the stylus sensing tablet.

40. A method as recited in claim 32, further comprising allowing the user to designate a position for the tracking menu and allowing the tracking symbol to cross the edge of the tracking menu without moving the tracking menu.

41. A method as recited in claim 32, further comprising converting the menu to an outline when the symbol crosses a boundary of a persistent object.

42. A method as recited in claim 41, further comprising:

converting the tracking menu to a complete graphical menu when the tracking symbol exits the persistent object; and clipping a portion of the complete graphical menu overlapping the persistent object.

43. A method as recited in claim 32, further comprising deforming a shape of the complete graphical menu to an outline when the tracking symbol approaches a boundary of a persistent object or display edge.

44. A method, comprising moving a first tracking symbol responsive to movement of a second tracking symbol, the first tracking symbol having a menu containing selectable objects with the menu having a menu boundary and comprising a mobile tracking region having a region boundary coincident with the menu boundary and moving the second tracking symbol responsive to an input transducer when the input transducer is in a tracking state, and the menu is always visible when one of the selectable objects is not activated and always not visible when one of the selectable objects is activated when the input transducer is in a down state over one of the controls.

45. A method, comprising using a single cursor movement to both move and activate a mobile control, the mobile control having a menu containing selectable objects with the menu having a menu boundary and comprising a mobile tracking region having a region boundary coincident with the menu boundary, and the menu is always visible when one of the selectable objects is not selected and always not visible when one of the selectable objects is selected when the single cursor is in a down state over one of the selectable objects.

46. An apparatus, comprising:

a position transducer;

a display; and a computer coupled to the display and the position transducer, and producing for display a first tracking symbol having a first tracking symbol position controllable by the position transducer when the position transducer is in a tracking state and a second tracking symbol containing the first tracking symbol, having a second tracking symbol position controlled by the position of the first tracking symbol and having controls selectable by the first tracking symbol, the second tracking symbol having a menu containing selectable objects with the menu having a menu boundary and comprising a mobile tracking region having a region boundary coincident with the menu boundary, and the menu is always visible when one of the selectable objects is not activated and always not visible when one of the selectable objects is activated when the position transducer is in a down state over one of the selectable objects.

47. A computer readable storage controlling a computer by allowing a user to move a tracking symbol on a computer display, and moving a tracking menu in correspondence to the tracking symbol when the tracking symbol is in a tracking state and the tracking symbol encounters an edge of the tracking menu, the tracking menu containing selectable objects, with the tracking menu having a menu boundary and comprising a mobile tracking region having a region boundary coincident with the menu boundary, and the tracking menu is always visible when one of the selectable objects is not activated and always not visible when one of the selectable objects is activated when the tracking symbol is in a down state over one of the selectable objects.

48. A computer readable storage controlling a computer with a first tracking symbol having a first tracking symbol position controllable by a user; and a second tracking symbol containing the first tracking symbol, having a second tracking symbol position controlled by the first tracking symbol and having a menu with objects selectable by the first tracking symbol with the menu having a menu boundary and comprising a mobile tracking region having a region boundary coincident with the menu boundary, and the menu is always visible when one of the selectable objects is not activated and always not visible when one of the selectable objects is activated when the first tracking symbol is in a down state over one of the selectable objects.

49. A graphical user interface display, comprising:
a display area that tracks a cursor tool when the cursor tool is in a tracking state and reaches a boundary of the display area, the display area having a display function; and
the cursor tool movable within the display area when in the tracking state and that drags the display area around when the boundary of the display area is reached and being activated by an input event when the cursor tool is in a down state, the display area having a menu containing selectable objects with the menu having a menu boundary and comprising a mobile tracking region having a region boundary coincident with the menu boundary, and the menu is always visible when one of the selectable objects is not activated and always not visible when one of the selectable objects is activated when the cursor tool is in the down state over one of the selectable objects.

50. A graphical user interface display, comprising:
a tracking symbol positioned corresponding to an input transducer movable by a user when the input transducer is in a tracking state; and
a mobile tracking region, on the graphical user interface display, having a region boundary enclosing the tracking symbol with the tracking symbol being movable when the input transducer is in the tracking state and within the region boundary when not dragging, the mobile tracking region moving in correspondence to the tracking symbol when the input transducer is in the tracking state and when the tracking symbol encounters the region boundary while moving, the mobile tracking region having controls activatable when the input transducer moving the tracking symbol is in a down state over the controls the controls, and the mobile tracking region is always visible when one of the controls is not activated and always not visible when one of the controls is activated when the input transducer is in the down state over one of the controls.

51. A graphical user interface display, comprising:
a tracking symbol positioned corresponding to an input transducer movable by a user when the input transducer is in a tracking state;
a mobile tracking region, on the graphical user interface display, having a region boundary enclosing the tracking symbol with the tracking symbol being movable when the input transducer is in the tracking state and the tracking symbol is within the region boundary, the mobile tracking region moving in correspondence to the tracking symbol when the input transducer is in the tracking state and the tracking symbol encounters the region boundary while moving, the mobile tracking region having controls activatable when the input transducer moving the tracking symbol is in a down state over the controls, the controls for selecting commands, and the mobile tracking region is always visible when one of the controls is not activated and always not visible when one of the controls is activated when the input transducer is in the down state over one of the controls.

52. A graphical user interface display, comprising:
a tracking symbol positioned corresponding to an input transducer movable by a user when the input transducer is in a tracking state; and
a menu, on the graphical user interface display, having an edge enclosing the tracking symbol with the tracking symbol being movable within the edge when the input transducer is in the tracking state, the menu moving in correspondence to the tracking symbol when the input transducer is in the tracking state and when the tracking symbol encounters the edge while moving, and a region defined within the edge having controls activatable when the input transducer moving the tracking symbol is in a down state over the controls, and the menu is always visible when one of the controls is not activated and always not visible when one of the controls is activated when the input transducer is in the down state over one of the controls.

53. A graphical user interface display, comprising:
a tracking symbol positioned on the graphical user interface display corresponding to an input transducer movable by a user when the input transducer is in a tracking state; and
a menu, on the graphical user interface display, having a menu boundary and comprising a mobile tracking region having a region boundary coincident with the menu boundary and enclosing the tracking symbol with the tracking symbol being movable within the region boundary when the input transducer is in the tracking state, the mobile tracking region moving in correspondence to the tracking symbol when the input transducer is in a tracking state and the tracking symbol encounters the region boundary while moving, the mobile tracking region having controls with boundaries and activatable when the tracking symbol is over one of the controls and the input transducer is in a down state.

54. A graphical user interface display, comprising:
a tracking symbol positioned on the graphical user interface display corresponding to an input transducer movable by a user when the input transducer is in a tracking state; and
a menu, on the graphical user interface display, having a menu boundary and comprising a mobile tracking region having a region boundary coincident with the menu boundary and enclosing the tracking symbol with the tracking symbol being movable within the region boundary when the input transducer is in the tracking state, the mobile tracking region moving in correspondence to the tracking symbol when the input transducer is in the tracking state and the tracking symbol encounters the region boundary while moving, the mobile tracking region having controls with boundaries and activatable when input transducer moving the tracking symbol is in a down state over the controls, the menu is always visible when one of the controls is not activated and always not visible when one of the controls is activated when the input transducer is in a down state, and the menu tracks the tracking symbol when the menu is not visible.

55. A graphical user interface display as recited in claim 53, wherein the mobile tracking region moves in correspondence to the tracking symbol without activating a selection button on the input transducer.

56. A graphical user interface display as recited in claim 53, wherein the menu boundary deforms when encountering a persistent object while moving on the graphical user interface display.

* * * * *

UNITED STATES PATENT AND TRADEMARK OFFICE
CERTIFICATE OF CORRECTION

| | | |
|---|---|---|
| PATENT NO. | : 7,770,135 B2 | Page 1 of 1 |
| APPLICATION NO. | : 10/684580 | |
| DATED | : August 3, 2010 | |
| INVENTOR(S) | : George W. Fitzmaurice | |

It is certified that error appears in the above-identified patent and that said Letters Patent is hereby corrected as shown below:

Column 15, Line 34 in Claim 50, delete "the controls," and insert --,--, therefor.

Signed and Sealed this
Fourth Day of January, 2011

David J. Kappos
*Director of the United States Patent and Trademark Office*